US007664705B2

(12) United States Patent
Walker et al.

(10) Patent No.: US 7,664,705 B2
(45) Date of Patent: Feb. 16, 2010

(54) METHODS AND SYSTEMS FOR ACCEPTING OFFERS VIA CHECKS

(75) Inventors: Jay S. Walker, Ridgefield, CT (US); Daniel E. Tedesco, Huntington, CT (US); Magdalena M. Fincham, Ridgefield, CT (US); Dean P. Alderucci, Westport, CT (US); Jason Krantz, Madison, WI (US)

(73) Assignee: Walker Digital, LLC, Stamford, CT (US)

( * ) Notice: Subject to any disclaimer, the term of this patent is extended or adjusted under 35 U.S.C. 154(b) by 934 days.

(21) Appl. No.: 10/855,653

(22) Filed: May 27, 2004

(65) Prior Publication Data

US 2005/0027650 A1 Feb. 3, 2005

Related U.S. Application Data

(63) Continuation-in-part of application No. 09/282,337, filed on Mar. 31, 1999, now abandoned.

(51) Int. Cl.
*G06Q 40/00* (2006.01)
(52) U.S. Cl. .......................................... 705/45; 705/39
(58) Field of Classification Search .................... 705/45
See application file for complete search history.

(56) References Cited

U.S. PATENT DOCUMENTS

| | | | | |
|---|---|---|---|---|
| 4,630,844 A | * | 12/1986 | Troy et al. ..................... 283/67 |
| 4,953,085 A | | 8/1990 | Atkins ......................... 364/408 |
| 5,053,607 A | | 10/1991 | Carlson et al. ............... 235/379 |
| 5,353,574 A | | 10/1994 | Copham et al. ................ 53/428 |
| 5,433,483 A | * | 7/1995 | Yu ................................ 283/58 |
| 5,604,341 A | | 2/1997 | Grossi et al. ................. 235/379 |

(Continued)

FOREIGN PATENT DOCUMENTS

JP 09147038 6/1997

(Continued)

OTHER PUBLICATIONS

BankAmerica Card for Small Businesses Features Overdraft protection at☐☐2% Rate☐☐BYLINE: By Robert Jennings.*

(Continued)

*Primary Examiner*—Daniel S Felten
*Assistant Examiner*—William E Rankins

(57) ABSTRACT

In accordance with one or more embodiments, a method and system are provided for facilitating the output of an offer to an account holder of a financial account, which offer the account holder may accept via a check being presented by the account holder as payment for a transaction. For example, the account holder may alter an indicium on the check to indicate acceptance of the offer. An example of an offer is an offer to sell to the account holder transactional overdraft protection for the transaction for which a check is provided as payment. Another example of an offer to provide a benefit to the account holder in exchange for a commitment by the account holder to an obligation. Such an offer may be provided by, for example, a merchant different than the merchant at which the check is being provided as payment for a transaction. In one or more embodiments, the offer or an indication of the offer may be printed on the check or handwritten on the check.

27 Claims, 16 Drawing Sheets

U.S. PATENT DOCUMENTS

| | | | | |
|---|---|---|---|---|
| 5,644,727 | A | 7/1997 | Atkins | 395/240 |
| 5,649,116 | A | 7/1997 | McCoy et al. | 395/238 |
| 5,737,440 | A | 4/1998 | Kunkler | 382/137 |
| 5,903,881 | A | 5/1999 | Schrader et al. | 705/42 |
| 6,036,344 | A | 3/2000 | Goldenberg | 364/408 |
| 6,128,603 | A | 10/2000 | Dent et al. | 705/40 |
| 6,212,504 | B1 | 4/2001 | Hayosh | 705/64 |
| 6,243,689 | B1 * | 6/2001 | Norton | 705/18 |
| 6,282,523 | B1 | 8/2001 | Tedesco et al. | 705/45 |
| 6,647,376 | B1 * | 11/2003 | Farrar et al. | 705/45 |
| 2002/0040344 | A1 * | 4/2002 | Preiser et al. | 705/42 |
| 2003/0130919 | A1 * | 7/2003 | Templeton et al. | 705/35 |
| 2007/0106558 | A1 * | 5/2007 | Mitchell et al. | 705/16 |

FOREIGN PATENT DOCUMENTS

| | | |
|---|---|---|
| WO | WO 92/10901 | 6/1992 |
| WO | WO 96/18162 | 6/1996 |
| WO | WO 00/00918 | 1/2000 |

OTHER PUBLICATIONS

Brown, Jim, "Ways to pay; Point-of-sale networks offer a variety of ways to transfer funds from customer to merchant.", Network World, Aug. 29, 1988, Section: Features; Industry Focus; p. 29.

Shipley, Chris, "Free software? That's good money management; Computer Associates International Inc.'s Kiplinger's CA-Simply Money personal financial management software; Software Review; First Looks; Evaluation", PC Magazine, Aug. 1993, Section: vol. 12, No. 14, p. 50, ISSN: 0888-8507.

Jennings, Robert, "BankAmerica Card for Small Businesses Features Overdraft Protection at 2% Rate", The American Banker, Apr. 3, 1995, Section: Credit/Debit/ATMs; p. 22.

Budinger, Charles J., "Take Steps to Make Zero Mortality Costs Clear", National Underwriter, Life & Health/Financial Services Edition, May 20, 1996, Section: Sales News & Trends, p. 16.

Tomasula, Dean, "Agents to represent traders; Intelligent Software Agents; Technology Information", Wall Street & Technology, Jul. 1996, Section: vol. 14, No. 7, p. 46, ISSN: 1060-989X.

Website: "AMCORE.com—Welcome", (http //www amcore com/indexed/commercial/products cfm), download date: 1997.

DePass, Dee, "U.S.Bancorp alters checking fees while expanding overdraft protection; Bank charges more to cover bad checks", Star Tribune, Jul. 11, 1998, Section: p. 3D.

Website: "What is a Credit Score?", ConsumerInfo.Com, (http //www consumerinfo com/n/cdtscore htm), download date: Feb. 5, 1999.

Website "Cortland Federal Credit Union Overdraft Protection Loans", (http //www cortlandfcu org/overdraft htm), download date: Oct. 20, 2000.

PCT International Preliminary Examination Report for Application No. PCT/US00/08200, in the name of Walker et al., entitled: "Method And System For Providing Transactional Overdraft Protection", mailed Sep. 24, 2001.

* cited by examiner

← 312

| NAME 401 | ACCOUNT IDENTIFIER 403 | ACCOUNT BALANCE 405 | TRANSACTIONAL OVERDRAFT INSURANCE SELECTED 407 |
|---|---|---|---|
| JEREMIAH BUCKLEY | 123456 | $859.96 | Y |
| BOB SMITH | 234567 | $98.19 | Y |
| REBECCA ANDERSON | 345678 | $1721.25 | Y |
| JANE DOE | 456789 | $1066.00 | Y |
| JENIFER ROGERS | 567890 | $6451.22 | Y |
| EILEEN SHIN | 678901 | $1929.37 | Y |
| ANDREW FROTH | 789012 | $445.54 | Y |
| ALEX SCHWARTZ | 890123 | $2241.89 | Y |
| FRED KOPP | 901234 | $810.73 | N |

FIG. 4

| ACCOUNT IDENTIFIER 500 | CHECKS INSURED 501 | SERIES CHECKS INSURED 503 | DOLLAR VALUE INSURED 505 | SPECIFIED PAYEE 507 | OVERDRAFT INSURANCE FEE 509 | PRIORITY PROCESSING 511 | OVERDRAFT PAYMENT FEE 513 |
|---|---|---|---|---|---|---|---|
| 123456 | 022 | NO | NO | NO | $3.00 | NO | $9.00 |
| 234567 | NO | 101-110 | NO | NO | $1.00 | YES | $9.00 |
| 345678 | NO | NO | $620.00 | NO | $2.00 | YES | $9.00 |
| 456789 | NO | NO | NO | STATE FARM INSURANCE CO. | $2.00 | YES | $9.00 |
| 567890 | 231, 232 | NO | NO | INTERNAL REVENUE SERVICE | $4.00 | NO | $9.00 |
| 678901 | NO | > 900 | NO | NATIONAL HOME MORTGAGE CO. | $3.00 | YES | $9.00 |
| 789012 | NO | NO | > $400.00 | GENERAL MOTORS ACCEPTANCE CORP. | $4.00 | YES | $9.00 |
| 890123 | NO | < 100 | $55.00 | NO | $3.00 | YES | $9.00 |
| 012345 | 1001 | NO | $175.00 | CONSOLIDATED EDISON | $3.00 | NO | $9.00 |

| ACCOUNT IDENTIFIER 601 | TRANSACTION IDENTIFIER 603 | OVERDRAFT AMOUNT 605 | TRANSACTION DATE/TIME 607 |
|---|---|---|---|
| 301410 | 108 | $12.30 | 11/22/98 12:45 |
| 911411 | 482 | $5.75 | 11/19/98 23:58 |
| 203212 | 331 | $0.18 | 11/23/98 2:54 |
| 505303 | 284 | $110.28 | 11/18/98 11:11 |

FIG. 6

METHODS AND SYSTEMS FOR ACCEPTING OFFERS VIA CHECKS

The present invention is a continuation-in-part of U.S. application Ser. No. 09/282,337, filed Mar. 31, 1999 now abandoned in the name of Walker et al. and entitled METHOD AND SYSTEM FOR PROVIDING TRANSACTIONAL OVERDRAFT PROTECTION. The entirety of this application is incorporated by reference herein for all purposes.

BACKGROUND OF THE INVENTION

In a commonplace financial arrangement, a customer (e.g., an account holder) of a financial institution (e.g. a bank) opens an account by depositing a value of currency into the account. Thereafter, the account holder may initiate a transaction in which a value of currency is transferred out of the account to a payee, such as a merchant or retailer, in order to settle any debts owed to the payee. This transaction may take the form of a check written against the account and payable to the payee. Additionally, the transaction may be an electronic transfer of funds from the customer's account to an account held by the payee. Also, the transaction may be a cash withdrawal from the account holder's account, after which the cash is given to the payee.

An overdraft on such an account occurs when the value of a transaction as described above exceeds the value of currency in the account from which funds are drawn. An overdraft may also occur where the value of the currency causes the account to drop below a required minimum balance established by the financial institution. Such overdrafts are considered undesirable by both account holders and by financial institutions. Such transactions are not favored by financial institutions because they must cover the overdraft amount with their own funds when the transaction is honored, or must expend time and resources to notify parties that the transaction is refused. As a result, a surcharge is typically assessed against the account holder's account by the financial institution for the overdraft, regardless of whether the transaction was honored. Banks in the United States assess surcharges that typically ranges from $12 to $28 per transaction regardless of the amount of the overdraft. Because of these fees, account holders typically wish to avoid an overdraft on the account as well. Furthermore, account holders seek to avoid overdrafts because when the transaction is not honored, the account holder is left indebted to the payee for the transaction amount. Causing an overdraft can also be embarrassing to the account holder, especially if the transaction involves a transfer to friends or family members.

Traditionally, a financial institution provides account holders with the opportunity to protect their accounts against such overdrafts by offering traditional overdraft protection programs. These programs guarantee payment of a transaction which would normally result in an overdraft. For example, when a check drawn against a checking account bounces, a bank maintaining the checking account will still honor the check if the account has overdraft protection. Such traditional overdraft protection programs provide protection on a continuing basis for the account. In other words, all qualified transactions for an account with overdraft protection are subject to the program's guarantee of payment without discretion. In general, two kinds of traditional overdraft protection programs are available: credit-based overdraft protection and transfer-based overdraft protection.

In a credit-based overdraft protection program, the financial institution holds the difference between the balance of available funds in the account and the amount of the transaction as a credit balance against the subject account. However, these prior art credit-based overdraft protection programs are limited in that the credit balance is usually restricted to a maximum currency value, e.g. $500.00. Additionally, the credit balance typically accrues interest from the first day it is applied. As a result, the accrued interest can quickly exceed the amount that would have been charged as a surcharge for the overdraft.

In a transfer-based overdraft protection program, a second account owned by the account holder is linked to the first account from which the transaction is processed. If a transaction as described above results in an overdraft, funds from the second account are transferred to the first account to cover the value of the overdraft. However, these prior art transfer-based overdraft protection programs are also limited in that when funds in the second account are insufficient to cover the amount of the overdraft, the financial institution may still refuse to honor the transaction. Furthermore, even when sufficient funds are available in the second account, a transaction fee may be charged against the overdrawn account for completing the transfer from the second account to the first. The transaction fee typically charged by banks in the United States is $5.00 per transfer.

Many account holders are dissatisfied with the "excessive" fees associated with overdrafts and traditional overdraft protection programs. Furthermore, many account holders do not choose to enlist in an overdraft protection program because of the obstacles involved, such as filling out a credit report and allowing the bank to review an account holder's credit history. Generally, financial institutions do not want to alienate their account holders by charging overdraft surcharges, transactions fees and the like. However, these fees generate revenues for financial institutions while discouraging account holders from engaging in transactions that result in an overdraft.

Thus, a need exists for providing an overdraft protection program which overcomes the limitations described above. In particular, a need exists for an overdraft protection program in which the fees charged by financial institutions are not "excessive" in the eyes of its customers, while at the same time, financial institutions can continue to collect sufficient revenue to cover potential overdrafts.

Additionally, an average person typically writes at least a few checks each month, either to pay bills mailed to the person or to pay for transactions at a point of sale. During the check-writing process the person is paying close attention to the check and the information presented therein. This is a marketing opportunity unrecognized by the prior art. Accordingly, a need exists for methods and systems that capitalize on this unrecognized marketing opportunity for the advantage of the account holder, one or more merchants, one or more financial institutions and/or other entities.

BRIEF DESCRIPTION OF THE DRAWINGS

A more complete understanding of the present invention, as well as further features and advantages thereof, will be obtained by reference to the following detailed descriptions when read in conjunction with the accompanying figures, of which:

FIG. 4 depicts an exemplary account database stored in the central computer of FIG. 3;

FIG. 5 depicts an exemplary rules database stored in the central computer of FIG. 3;

FIG. 6 depicts an exemplary overdraft protection database stored in the central computer of FIG. 3;

DETAILED DESCRIPTION OF EMBODIMENTS OF THE INVENTION

Figure 1:
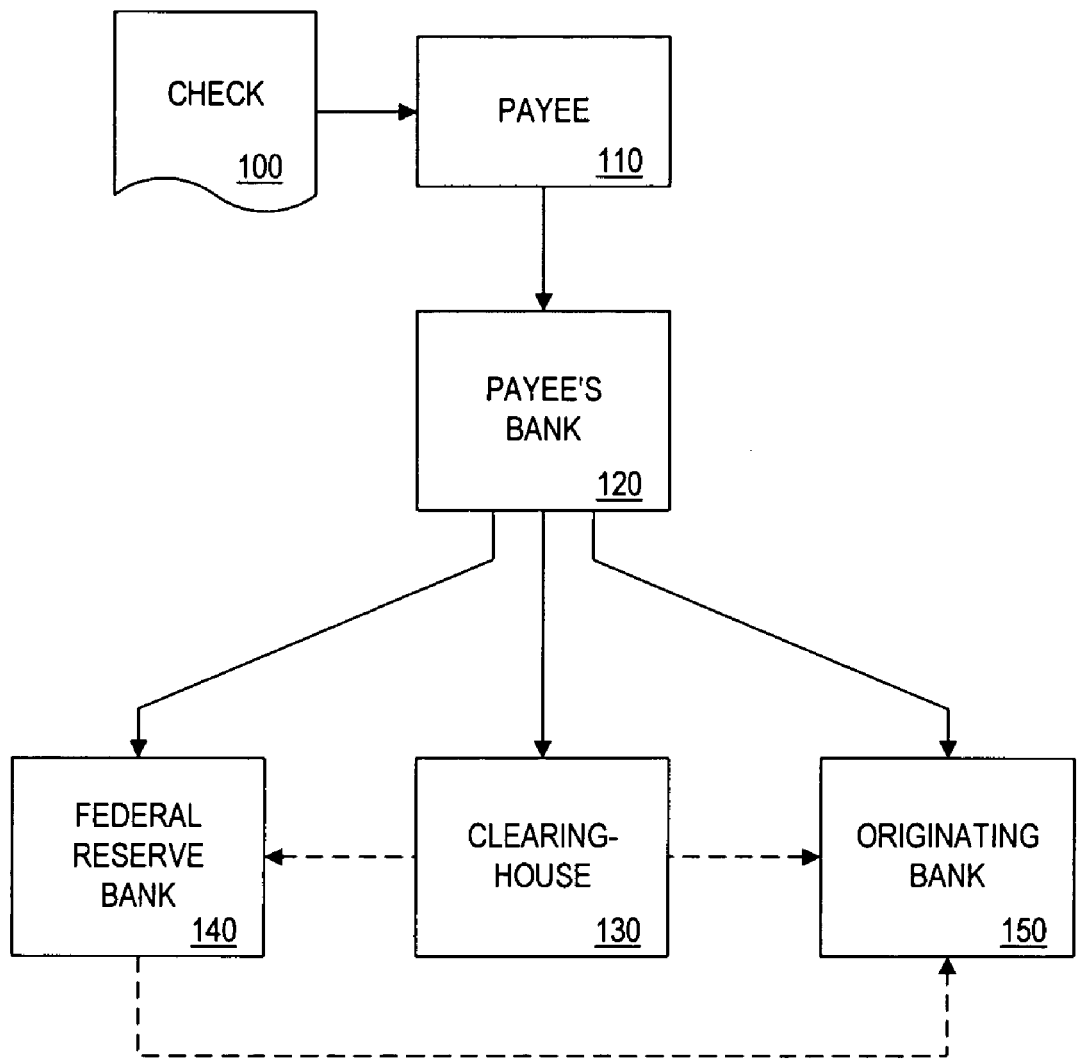
FIG. 1 is an overview of a check clearing process, well-known in the prior art.

In accordance with some embodiments of the present invention, a transactional overdraft protection program is disclosed by which an account holder may elect to protect an account from an overdraft by designating one or more individual transactions under the program. This transactional overdraft protection program differs from overdraft protection programs of the prior art in that, unlike traditional overdraft protection programs, the transactional overdraft protection program does not apply to all transactions drawn against the subject account, but rather, applies only to the designated transaction or transactions. In this regard, a transactional overdraft protection program allows an account holder to "insure" a single transaction rather than his entire account. Analogously, a transactional overdraft protection fee acts as a premium for the "insurance" that the account holder has purchased for the transaction. In one embodiment of the invention, "insured" transactions are processed last on a given day so that uninsured transactions can be processed against funds existing in the account holder's account before such funds are depleted by the insured transactions. This procedure diminishes the likelihood that an overdraft will occur due to a clearance of an uninsured transaction which is presented on the same day as an insured transaction.

According to one or more embodiments of the present invention, a method and system for providing transactional overdraft protection to a customer having a financial account comprises: receiving, from the customer, an indication of a transaction for transactional overdraft protection; and processing the transaction, after the receiving step.

According to one or more embodiments of the present invention, a method for registering a check drawn against a checking account in a transactional overdraft protection program comprises: receiving a bill from a payee; and transmitting to the payee a check having an indicium corresponding to a transactional overdraft protection program, in response to the receiving step.

According to one or more embodiments of the present invention, a method for registering in a transactional overdraft protection program a transaction drawn against a financial account comprises: initiating a transaction wherein an amount of funds from the financial account will be transferred to a payee; and indicating that the transaction is to be protected by the transactional overdraft protection program.

According to one or more embodiments of the present invention, a method of receiving payment comprises: billing a customer; receiving a payment from the customer in response to the billing step, the payment including a check having an indicium corresponding to a transactional overdraft protection program; and depositing the check into a financial account.

According to one or more embodiments of the invention, a method and system for producing a check for use by a customer in a transactional overdraft protection program comprises: printing on the check an indicium for use by the customer in electing transactional overdraft protection for the check; and transmitting the check to the customer.

In this manner, a financial institution's exposure to overdrafts are limited in that only designated transactions are protected. Thus, lower fees for both the transactional overdraft insurance and for an overdraft may be provided without negatively affecting the profitability of the financial institution. The transactional overdraft protection program, in turn, will also satisfy customers of the financial institution since fees may be lower than what is typically charged for traditional overdraft protection programs. Customers will have more control of fees that they may be charged because they determine which of their transactions are to be protected. Additionally, merchants may be more willing to accept a check protected under a transactional overdraft protection program, since payment on the check is guaranteed.

Some embodiments of the instant invention, discussed in terms of a checking transaction, will now be detailed in the following figures. FIG. 1 represents a typical path through which a checking transaction is processed, as is well known in the prior art. A check 100 written by an account holder against a checking account is presented to a payee 110. The payee 110 then, for example, may deposit the check 100 into its account, managed by payee's bank 120. From there, the payee's bank 120 may process the check 100 in a number of manners.

First, the check 100 may be presented to a Federal Reserve bank 140. Federal Reserve bank 140 will then present check 100 to originating bank 150 which manages the account from which check 100 was drawn against. If sufficient funds are available in the account, check 100 will be cleared and funds debited from the account holder's account will be transferred from originating bank 150 to Federal Reserve bank 140 in the amount for which check 100 was written. In turn, Federal Reserve bank 140 will transfer the funds to payee's bank 120. Payee's bank 120 will then credit payee's account with the received funds.

Alternatively, check 100 may be presented to clearinghouse 130 by payee's bank 120. Clearinghouse 130 may then present check 100 to either Federal Reserve bank 140 or originating bank 150. If the check 100 is presented to Federal Reserve bank 140, the checking transaction is processed as described in the preceding paragraph. If the check 100 is presented to originating bank 150, then originating bank 150 will determine if sufficient funds are available in the account holder's account. If sufficient funds are available in the account, check 100 will be cleared and funds debited from the account holder's account will be transferred from originating bank 150 to clearinghouse 130 in the amount for which check 100 was written. In turn, clearinghouse 130 will transfer the funds to payee's bank 120. Payee's bank 120 will then credit payee's account with the received funds.

Additionally, payee's bank 120 may present the check directly to originating bank 150 which will then determine if sufficient funds are available in the account holder's account. If sufficient funds are available in the account, check 100 will be cleared and funds debited from the account holder's account will be transferred from originating bank 150 directly to payee's bank 120 in the amount for which check 100 was written. Payee's bank 120 will then credit payee's account with the received funds.

It is to be understood that the check transaction processing described above is representative only and, furthermore, may be completed with some variations that would be apparent to one of ordinary skill in the art.

Figure 2:
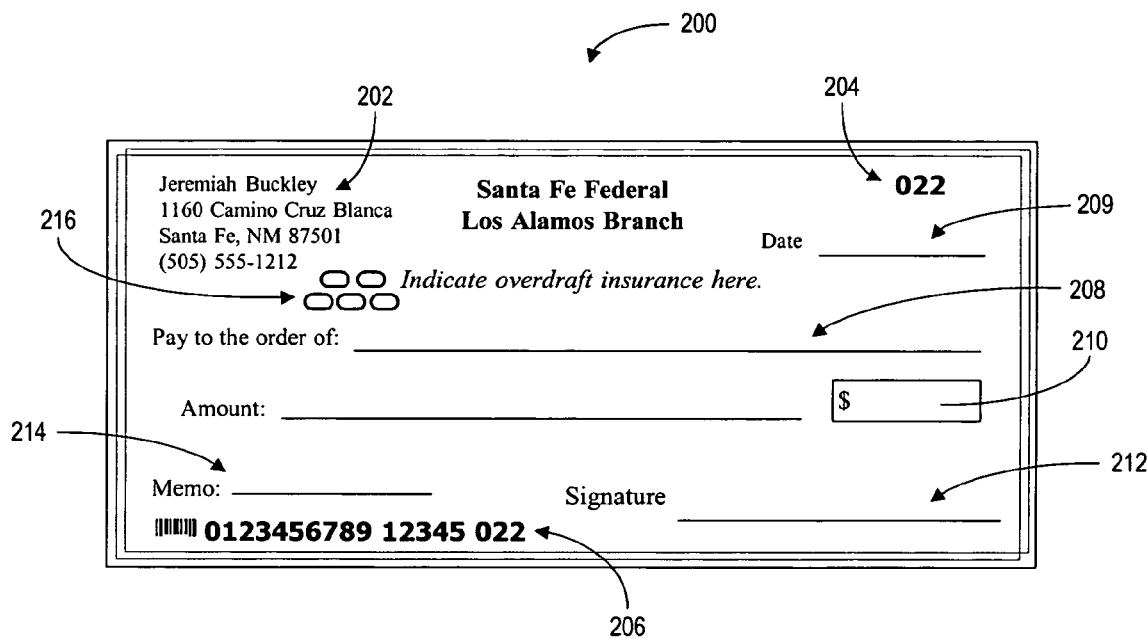
FIG. 2 is a diagram illustrating a check to be used with one embodiment of the present invention.

Referring now to FIG. 2, a check 200 to be used in one embodiment of the present invention is displayed. Check 200 includes several features that are common to checks in the prior art. Account holder identification information 202 lists the name, address and telephone of an account holder. Serial number 204 is a unique identifier provided on each check printed for the account holder's account. ABA Routing Number 206 is used in the processing of a checking transaction involving check 200. ABA Routing Number 206 includes information corresponding to serial number 204 as well as the account number from which the check is drawn and a code corresponding to the originating bank which manages the account holder's account. Payee line 208 is provided so that the account holder may indicate a payee to whom the funds are to be transferred. Date line 209 is provided so that the account holder may indicate a date that check 200 is payable. Amount line 210 is provided so that payee may indicate the amount of funds that are to be provided to payee. Signature line 212 is provided so that the account holder may sign the check, which in turn authorizes the account holder's originating bank to transfer the funds indicated in amount line 210. Finally, memo line 214 is provided so that the account holder may write in reference information, such as an invoice number of a bill that is being paid by the check 200. Other information may provided in memo line 214 as discussed further hereinbelow.

One feature of check 200, which is not present on checks of the prior art, is indicium 216 which is used to designate check 200 for transactional overdraft protection. In accordance with the present invention, indicium 216 is preferably pre-printed on check 200 by a check issuer prior to being sent to the account holder for use in transferring funds. In one preferred embodiment, the indicium 216 printed on check 200 must be altered by the account holder in order to designate check 200 for protection in a transactional overdraft protection program. Such alteration may include marking one or more of the five ovals of indicium 216. Furthermore, the number and position of ovals that are to be marked may be pre-registered with the bank that manages the account holder's account. In this manner, the bank may be reasonably assured that the account holder has truly authorized that the transaction is to be protected under the transactional overdraft protection program and that the payee didn't fraudulently authorize the protection.

In another embodiment, indicium 216 may be a pre-printed symbol, a sticker which may be placed on the check, or code (not shown) which does not require alteration by the account holder in order for the check to be protected under a transactional overdraft protection program. For example, the symbol may be selected by the bank and printed on one or more of a series of special checks issued to the account holder. When the account holder uses the check, and the check is received by the bank for processing a checking transaction, the bank will recognize the symbol and process the check under the transactional overdraft protection program.

Additionally, it is to be understood that indicium 216 is not necessary to practice the instant invention. For example, the account holder may register a check for protection under a transactional protection program of the instant invention by calling or otherwise notifying the bank that the transaction is to be protected. Such notification would preferably include uniquely identifying the transaction by one or more of the series number of line 204, a payee written in line 208, a date written in line 209, the amount of the transaction written in line 210 and the like. Such notification may take place through a telephone interactive voice response unit operated by the bank, or over a communications line connected between a bank computer and account holder's computer. Alternatively, the account holder may notify the bank in person by traveling to the bank's location and providing an identification of the transaction.

In still another embodiment, the bank may provide the account holder with a code to be included on memo line 214. Preferably, the code would be known only to the bank and the account holder. In this manner, when a proper code appears on memo line 214, the bank may be reasonably assured that the account holder has truly authorized that the transaction is to be protected under the transactional overdraft protection program. The provision of a code for use on a check is described in more detail in co-pending U.S. patent application Ser. No. 09/106,888 entitled "METHOD AND APPARATUS FOR PROCESSING CHECKS TO RESERVE FUNDS" filed in the name of Daniel E. Tedesco et al. on Jun. 29, 1998, the application assigned to the assignee of the present invention and incorporated herein by reference.

Figure 3:
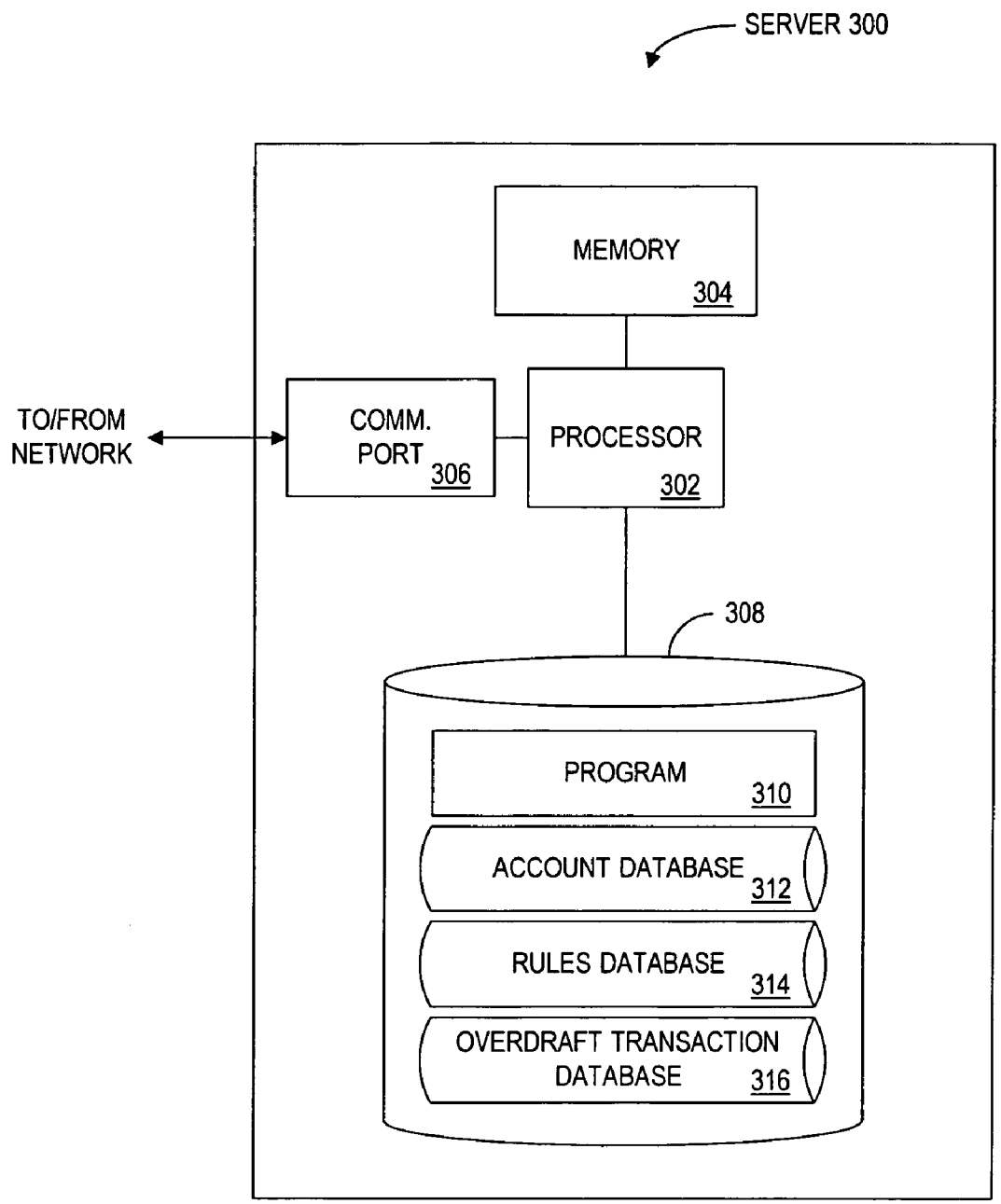
FIG. 3 is a block diagram illustrating the exemplary components of a financial institution's central computer used for the check clearing process of FIG. 1 and in conjunction with the present invention.

FIG. 3 illustrates the exemplary components of a central computer 300 operated by a financial institution for implementing a transactional overdraft protection program of the instant invention. Central computer 300 has a processor 302, a memory 304, a communications port 306 and a data storage device 308. Processor 302 may be any commonly manufactured microprocessor chip, such as the Pentium II® manufactured by Intel Corporation. Processor 302 runs at a clock speed (typically measured in megahertz (MHz)) determined by a clock (not shown).

Processor 302 is operatively connected to a memory 304 which may include random access memory (RAM) and read-only memory (ROM). RAM may be one or more single inline memory module (SIMM) chips capable of storing a predetermined amount of data (typically measured in megabytes), and is used by processor 302 for temporary storage of processing instructions during operation of central computer 300. Read-only memory (ROM) is at least one permanent non-erasable and non-rewritable memory chip that stores initializing instructions to be used by processor 302 during, for example, a start-up routine performed by central computer 300. Further functions of random access memory (RAM) and read-only memory (ROM) will be apparent to one of ordinary skill in the art.

Processor 302 is further operatively connected to communication port 306, which may be one or more of the following commonly known computer peripherals used for computer-related communications: a parallel port, a serial port, a network card, a fax/modem/telephone port and/or any combination of the same. Communication port 306 is operatively connected to transfer data between processor 302 and a network (not shown).

Processor 302 is further operatively connected to data storage device 308, which may be any one of the following commonly known computer peripherals used for storing computer data: a hard drive, a floppy disk drive, a DVD drive such as those manufactured by Phillips Electronics, a ZIP drive such as those manufactured by IOMEGA, a tape drive, a Digital Audio Tape drive and/or any combination of the same or equivalents thereto. Further such devices will be apparent to one of ordinary skill in the art.

Data storage device 308 is operative to store program 310 which may include an operating system, one or more application programs, or an Internet-accessible web site, each operative to successfully control central computer 300 in accordance with the systems and methods of the present invention. Data storage device 308 is further operative to store an account database 312, a rules database 314, and an overdraft transaction database 316, each discussed further below with reference to FIGS. 4-6, respectively.

FIG. 4 depicts an exemplary account database 312 as stored in data storage device 308 for use with the present invention. Account database 312 contains the following exemplary fields: a name field 401, an account identifier field 403, an account balance field 405, and transactional overdraft insurance selected field 407. Each row in account database 312 represents one record stored therein.

Name field 401 contains, for each record, a name of an account holder having a financial account with the financial institution operating central computer 300. In an embodiment where the transaction to be protected is a checking transaction, the information stored in name field 401 corresponds to the name listed in the account holder identification information 202 of check 200. Furthermore, the information included in name field 401 may include an address and a telephone number of the account holder, as well as other pertinent identification information.

Account identifier field 403 contains, for each record, an account identifier of an account owned by the corresponding account holder listed in name field 401. In an embodiment where the transaction to be protected is a checking transaction, this information corresponds to a portion of the data provided in ABA routing number 206 of check 200.

Account balance field 405 contains, for each record, a current balance of available funds corresponding to the account identified in the corresponding record of account identifier field 403. The balance of available funds is preferably updated with each transaction processed against the subject account. Further information, such as a minimum required balance, may also be stored in account balance field 405, or may be stored in an additional field (not shown) of account database 312.

One of ordinary skill in the art will readily appreciate that there are inherent delays in checking transactions such that the balance of available funds does not track outstanding checks in real time. In other words, there may be a lag between the time a check is issued and the time the check is processed by the account holder's bank such that the balance of available funds may not reflect the actual account balance at any given time. This inherent delay in processing facilitates an overdraft in the account, because an account holder, relying on the balance of available funds obtained from the financial institution, may write a check in reliance on the balance indicated when, in fact, the balance is less than the amount stated due to outstanding checks that have not been processed.

Transactional overdraft insurance selected field 407 contains, for each record, an indication of whether the corresponding account owner has selected some form of transactional overdraft protection for a transaction, such as a check drawn on an account corresponding to the account identifier. When a record indicates that the account holder has elected transactional overdraft protection, a corresponding record for the account will preferably appear in rules database 314, discussed next in conjunction with FIG. 5.

FIG. 5 depicts an exemplary rules database 314 that contains the following exemplary fields: account identifier field 500, checks insured field 501, series checks insured field 503, dollar value insured field 505, specified payee field 507, overdraft insurance fee field 509, and priority processing enabled field 511. Rules database 314 stores information regarding which features of a transactional overdraft protection program each of a plurality of account holders has chosen to elect.

Account identifier field 500 contains the same type of information as described for account identifier field 403, described previously. Preferably however, only those account identifiers for which transactional overdraft protection has been elected, as indicated in field 407, will be listed in account identifier field 500 of rules database 314. Furthermore, if an account that previously was not subject to transactional overdraft protection is later designated for such protection, then a new record for such account will be entered into the database.

Checks insured field 501 contains, for each record, one or more individual series numbers of checks for which transactional overdraft insurance is to be applied. The series numbers listed in this field correspond to series number 204 of check 200 as displayed in FIG. 2. Of course, in an embodiment in which the transaction to be protected is not a checking transaction, other identifications of the transaction may be stored in field 501. Such identifications may include a date of the transaction, an amount of a transaction, an identifier corresponding to the payee, and a reference number of the transaction.

Series checks insured field 503 contains, for each record, a sequential series of checks that are to be protected under the transactional overdraft protection program of the instant invention. The series of checks may be designated by the account holder. Alternatively, the series of checks may be pre-designated by the financial institution.

Dollar value insured field 505 contains, for each record, an indication of whether the account holder of the account corresponding to the record has indicated a dollar value of a check or transaction for which transactional overdraft protection is to be applied. It is contemplated that the account holder may designate a particular dollar value or a range of dollar values. For example, the account holder may designate that all checks greater $500.00 dollars are to be protected. Alternatively, if transactional overdraft protection is limited to a maximum dollar value of, for example, $1000 by the financial institution, the account holder may designate that all transactions in the range of $500.00 to $1000 are to be automatically protected. Other variations will be apparent to one of ordinary skill in the art.

Specified payee field 507 contains, for each transaction, an indication of a particular payee, where transactions to such payee are to be automatically protected under the transactional overdraft protection program. This feature is contemplated to include a payee name, as depicted in FIG. 5. However, other identifications, such as an account number, a federal taxpayer identification number or a social security number could be used in place of the name of the payee.

Overdraft insurance fee field 509 contains, for each transaction, an indication of the fee that is to be assessed against the corresponding account for each transaction that is protected under the transactional overdraft protection program. The fee may be determined in a number of manners. The fee may be based on the types of transactional overdraft features that are selected by an account holder. For example, each marked check listed in checks insured field 501 may incur a fee of $3.00. Similarly, each check in a pre-designated series of checks listed in series checks insured field 503 will incur a fee of $1.00. Likewise, a fee of $2.00 may be assessed for each transaction that falls under the dollar value insured category or the specified payee category, represented by dollar value insured field 505 and specified payee field 507, respectively. Furthermore, the fees charged could equal a percentage of the transaction amount that is being protected rather than a fixed charge.

The fees indicated above are to be understood to be representative only. Many methods for determining an appropriate fee for these features are available and apparent to one of ordinary skill in the art. In particular, the fees could be determined by a method of risk evaluation involving either a particular account holder or a group of account holders. Information such as the credit history or histories of these account holders may be used to determine a statistical expectation of the dollar value of checks that may be bounced in a particular time period. The fees may then be determined based on the number of persons who are statistically likely to elect transactional overdraft protection. Such risk evaluation methods are discussed, for example, in "What is a Credit Score", ConsumerInfo.com, Inc. (http://www.consumerinfo.com).

Additionally, fees may determined progressively. For example, a financial institution may implement a schedule of charges for a transactional overdraft protection program in which the first five protected transactions in a month incur a $1.00 charge each, the second five protected transactions incur a $2.00 charge each, etc.

Priority processing field 511 contains, for each record, an indication of whether transactions processed under the transactional overdraft protection program will be processed after other transactions against the subject account received within a predetermined time (typically, on the same day). Such priority processing may be included automatically when an account holder elects transactional overdraft protection. Alternatively, the account holder may be required by the financial institution to elect priority processing as a separate optional feature, and may charge an additional fee for such service.

In addition to the above description, "priority processing" as used herein may also refer to a transaction clearing process wherein multiple transactions involving the same account, that are received for processing in the same time period, are cleared starting with the lowest value transaction first, and then processing the remaining transactions in order of increasing value. This maximizes the number of transactions that can be processed without an overdraft occurring. For example, if an account holder has a $50 balance in an account and three transactions for $45, $25 and $15 are received for processing, an overdraft condition will occur in the processing of the last two transactions if the largest transaction is cleared first. However, under this additional method of priority processing, the $15 transaction is processed first, then the $25 transaction, and then the $45 dollar transaction. The $15 and $25 dollar transactions will both clear. The $45 transaction, however, will result in an overdraft from the account.

A hybrid of these types of priority processing produces a preferred embodiment of this aspect of the invention wherein unprotected transactions are always processed in order of increasing value and transactions selected for transactional overdraft protection are always processed afterwards, and also in order of increasing value. Thus, in the example immediately above, if the $45 transaction is protected by transactional overdraft protection, and the $15 and $25 are priority-processed, all three transactions will clear.

Overdraft payment fee field 513 contains, for each record, a value that will optionally be charged against the corresponding account if a transaction designated for transactional overdraft protection causes an overdraft against the account. The fee charged here is contemplated to be an additional fee to that charged for electing to protect a transaction under the transactional overdraft protection program. Thus, even if a protected transaction is cleared, an additional fee may be charge when the account is actually overdrawn.

FIG. 6 displays overdraft transaction database 316 contains the following exemplary fields: account identifier field 601, transaction identifier field 603, overdraft amount field 605 and transaction date/time field 607. Account identifier field 601 preferably contains the same type of information as described for account identifier field 403 and account identifier field 500, as described above. However, it is preferable that only those account identifiers for which an overdraft has occurred will be listed in account identifier field 601. Overdraft protection database 316 stores information regarding accounts which have incurred an overdraft. Overdraft transaction database 316 may further be used to track a number or a value of transactions for a particular account which have incurred overdrafts. In an embodiment where transactional overdraft protection may be applied to a predetermined number of transactions or a predetermined value of transactions, overdraft transaction database 316 may confirm that an account has not exceeded such predetermined number or value.

Transaction identifier field 603 contains, for each record, an identifier corresponding to a transaction that results in an overdraft for the subject account. In an embodiment where the transaction is a checking transaction, the identifier stored in this field may be the series number of the check. However, other identifiers of the transaction may be used, such as a date of the transaction, an amount of the transaction, a transaction identification number, a payee of the transaction, and the like.

Overdraft amount field 605 contains, for each record, an indication of the amount by which the subject account has been overdrawn due to the transaction identified in field 603 (i.e. the difference between the balance of available finds and the amount of the transaction). As described above, such an amount may be subject to accrued interest until the balance has been paid by the account holder.

Transaction date/time field 607 contains, for each record, an indication of the date and time that the subject transaction was processed. This information may be used, inter alia, to determine a date from which interest on the overdrawn amount begins to accrue. It may also be used to determine whether the transaction should be processed in accordance with priority processing, as discussed above. This can be accomplished, for example, by comparing the time of the overdrawn transaction to the time of processing of other transactions drawn on the same account.

Figure 7:
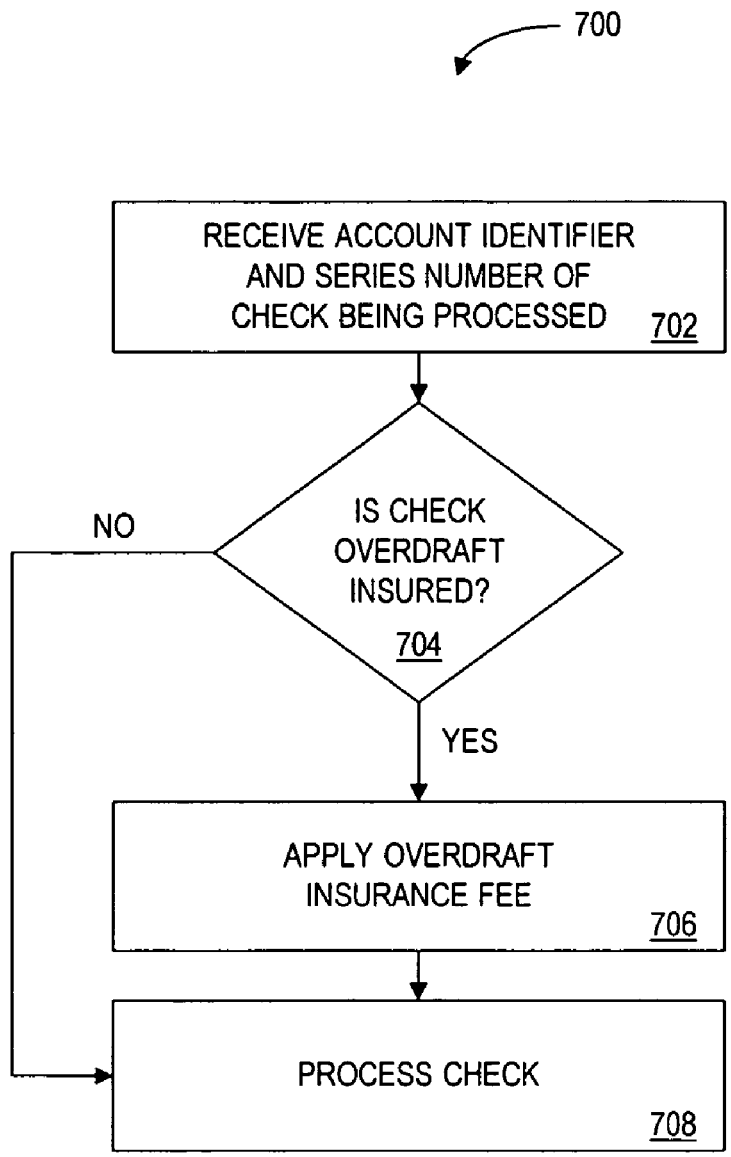
FIG. 7 is a flowchart illustrating the steps performed by the central computer of FIG. 3 during an exemplary transaction clearing process performed under a transactional overdraft protection program of the present invention.

Referring now to FIG. 7, an exemplary transaction clearing process 700 performed by central computer 300 for a transactional overdraft protection program is depicted. In this exemplary process, a checking transaction is presumed although such process may equally apply to other types of financial transactions. The transaction clearing process 700 begins when a check is received by the financial institution for processing. Upon receipt, the financial institution retrieves the account identifier from ABA routing number 206 and the series number 204 of the check (step 702). This information is preferably input into an application program 310 run by central computer 300 to process checking transactions.

Next, the financial institution will determine if the check is protected under a transactional overdraft protection program (step 704). This may be accomplished by determining whether indicium 216 appears on the check and, if required, whether the indicium has been appropriately altered by the account holder. Alternatively, the financial institution may query rules database 314 to see whether the information from the check matches any information provided in marked checks insured field 501, series checks insured field 503, dollar value insured field 505 and specified payee field 507.

If the check is determined to be protected by a transactional overdraft protection program (e.g. where the appropriate indicium appears on the check or the check information matches any of the information in fields 501-507 for the account), the financial institution may assess an overdraft insurance fee to the account (step 706). The overdraft insurance fee that is to be applied may be retrieved from insurance fee field 509. The process then continues to step 708. If the check is not determined to be protected by a transactional overdraft protection program, the process, likewise, continues on to step 708.

At step 708, the check is processed in a conventional manner by transferring funds from the subject account to the payee listed on the check at payee line 208, unless an overdraft occurs as a result of the transaction. If such overdraft occurs, the financial institution may not honor the transaction unless the account is protected by either traditional overdraft insurance or by the transactional overdraft protection disclosed in the present invention.

Figure 8A:
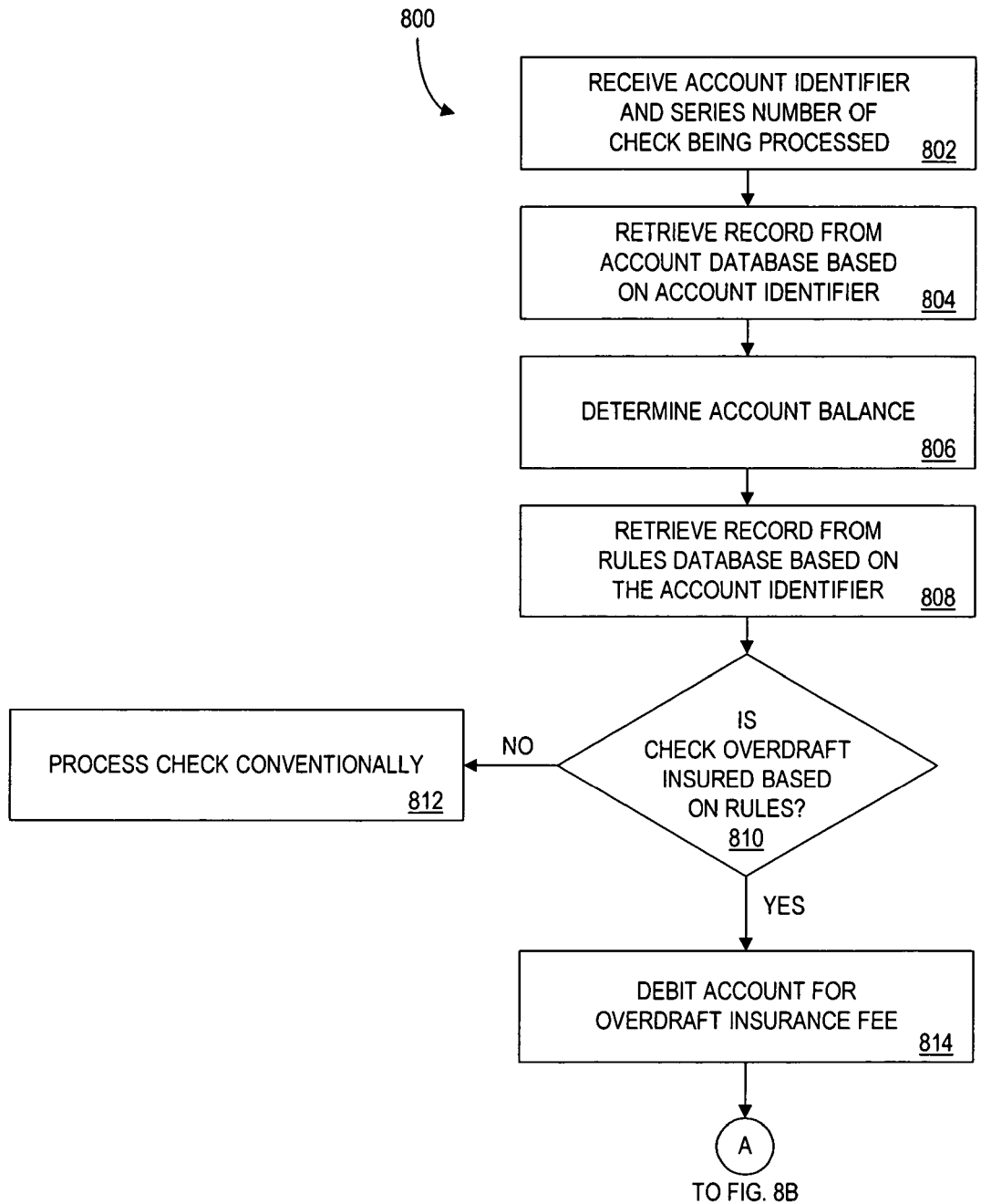
FIGS. 8A and 8B are a flowchart illustrating the steps performed by the central computer of FIG. 3 during a second exemplary transaction clearing process performed under a transactional overdraft protection program of the present invention.
Figure 8B:
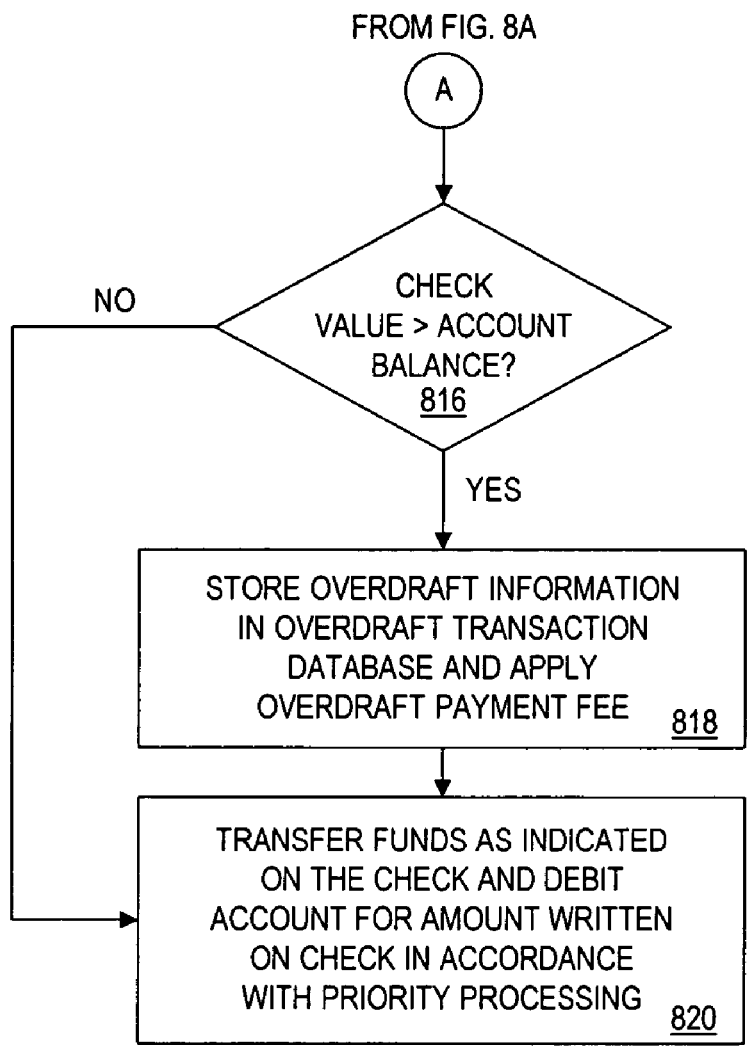

FIGS. 8A and 8B depict a second exemplary transaction clearing process 800 performed by central computer 300 for a transactional overdraft protection program of the present invention. Again, it is presumed that the exemplary transaction is a checking transaction, although such a process may apply to other types of financial transactions. Transaction clearing process 800 begins at step 802 when a check is received by the financial institution for processing. Upon receipt, the financial institution retrieves the account identifier from ABA routing number 206 and the series number 204 of the check. This information is preferably input into an application program 310 run by central computer 300 to process checking transactions.

In response to the input, central computer 300 retrieves a record from account database 312 corresponding to the account from which the check was written (step 804). The account balance is retrieved from account balance field 405 (step 806). Next, a record corresponding to the account is retrieved from rules database 214 (step 808). From this record, and based upon the check information, central computer 300 receives inputs from which it determines whether the check is protected by a transactional overdraft protection feature (step 810). This may be accomplished by determining whether indicium 216 appears on the check and, if required, whether the indicium has been appropriately altered by the account holder. Alternatively, the financial institution may query rules database 314 to see whether the information from the check matches any information provided in marked checks insured field 501, series checks insured field 503, dollar value insured field 505 and specified payee field 507. If it is determined that the check is protected under the transactional overdraft protection program, process 800 continues to step 814, below. Otherwise, process 800 continues to step 812, where the checking transaction is processed in a conventional manner.

At step 814, central computer retrieves the overdraft insurance fee from overdraft insurance fee field 509 at the record corresponding to the subject account. This fee is then scheduled to be deducted from the account balance stored in account balance field 405. Next, the value of the check is determined from amount line 210 and entered into program 310. Central computer 300 then compares this value to the balance of available funds in the subject account (step 816). If the value of the check is greater than the account balance, process 800 then continues to step 818. Otherwise, process 800 continues to step 820, discussed below.

At step 818, central computer 300 determines the amount of the overdraft and stores the account identifier, the transaction identifier, the amount of the overdraft and the date and time of the transaction in the appropriate fields 601-607 of overdraft transaction database 316. Furthermore, central computer 300 optionally applies the overdraft payment fee, retrieved from overdraft payment fee field 513, to the subject account. Process 800 then continues to step 820 where the transaction is processed by transferring the funds listed on amount line 210 to the payee listed on payee line 208 and debiting the transferred funds from the account balance listed in account balance field 405 in accordance with account holder's priority processing instructions.

Figure 9:
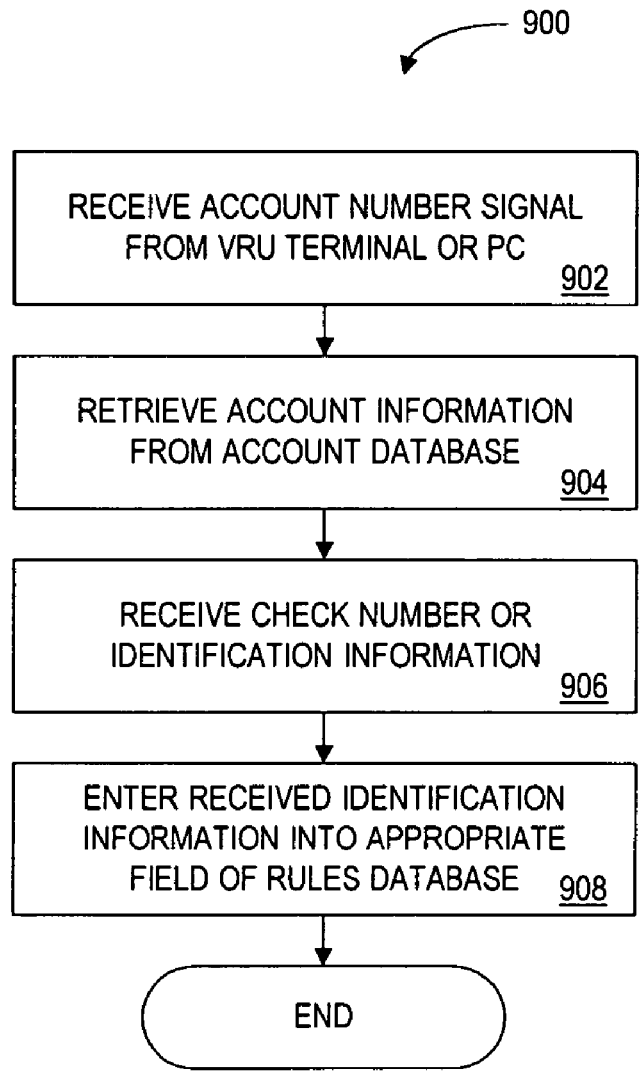
FIG. 9 is a flowchart illustrating the steps performed by the central computer of FIG. 3 during a transaction registration process performed under a transactional overdraft protection program of the present invention.

FIG. 9 depicts a transaction registration process 900 performed by central computer 300 for a transactional overdraft protection program of the present invention. It is contemplated that central computer 300 may communicate through communications port 306 with a web site run by the financial institution on the Internet (not shown), an Automatic Teller Machine (ATM) (not shown) and/or a telephone interactive voice response unit (IVRU) (not shown), as is well known in the art. In this manner, an account holder or customer of the financial institution may send and receive information directly to central computer 300 without the need for a bank teller or the like to process a transaction. One purpose for this is to provide the customer an opportunity to perform transactions at his or her convenience on a twenty-four-a-day basis. One type of transaction, to be used with the present invention, allows the customer to register a transaction for a transactional protection program. Transaction registration program 900, described below, allows the customer to perform this transaction.

Transaction registration program 900 begins at step 902 where a customer transmits the customer's account number and, preferably, a security code for the account from an IVRU or a personal computer connected to the Internet, through communications port 306 to central computer 300. At step 904, central computer 300 retrieves the customer's account information from account database 312 and may transmit some of the information to the customer. At step 906, the customer transmits an identification of a transaction to be protected by the transactional overdraft protection program. The identification may consist of a series number or a sequence of series numbers for one or more checking transactions. Alternatively, a customer may identify a transaction to be protected by providing to the financial institution, inter alia, a date of the transaction, an amount of the transaction and/or a payee of a transaction. Central computer 300 then stores the received identification information into the appropriate field of rules database 314 for later retrieval when the transaction is being processed by the bank (step 908).

An account holder may further register a transaction for transactional overdraft protection through an ATM machine.

In one example, an account holder inserts an identification card into the ATM, enters his account number and/or password, and selects an option, such as "Register Transaction for Overdraft Protection" from a menu of functions displayed by the ATM. After the account holder selects the register function, the account holder is prompted to enter transaction identification information as described above. The ATM then communicates this information to central computer 300, which, in turn, stores the data in the appropriate records and fields of rules database 314.

In a second example, an account holder may select a transaction at an ATM device, such as a cash transfer function, and select overdraft protection for the transaction at the same time. This may happen where an account holder selects a function such as "Transfer $1200 from my checking account to my mortgage company on Mar. 31, 1999." Before the transaction is completed, the ATM may inquire "Do you want to protect this transaction against overdraft?" The account holder may then respond that he or she desires transactional overdraft protection for the transaction, at which time the ATM communicates this information to the central computer 300. The central computer 300, in turn, stores the data in the appropriate records and fields of rules database 314 and the appropriate fees are applied against the account.

While some embodiments for carrying out the invention have been described in detail in the foregoing, those of ordinary skill in the art to which the instant invention relates will recognize various alternative designs and embodiments for practicing the invention. In particular, the methods and systems disclosed above, though discussed in terms of transactions involving a check from a checking account, are equally applicable to other types of transactions from other types accounts, such as savings accounts, money market accounts, credit card accounts or the like. In these alternate embodiments, a customer may identify a transaction to be protected by providing, inter alia, an account identifier, a date of the transaction, an amount of the transaction and/or a payee of a transaction. Such identification may take place over a communications network wherein the account holder contacts the financial institution through an interactive voice response unit, a modem connection to a BBS or an Internet web site, an ATM machine and the like. Furthermore, any financial institution in the chain of payment, including but not limited to the financial institution or bank holding the financial account, may provide the transactional overdraft protection. Finally, it is to be understood that the databases and data stored therein, as depicted in the figures, may be rearranged or combined into different structures.

Additional Embodiments

In one or more embodiments, a check may be utilized as a means to present an offer to an account holder, a means for the account holder to accept an offer, and/or a means for an account holder to provide an instruction to disburse funds to a second payee (distinct from the primary payee to whom the check is presented). For example, a merchant may cause an offer for a product to be printed on a check in a manner that allows the account holder to accept the offer when presenting the check to a payee. In one embodiment, a merchant may cause an offer for a product to be printed on a check along with a corresponding signature line, check-off box or other indicium alterable by the account holder. The merchant who may cause the offer to be printed on the check may comprise, for example, the merchant to whom the check is being presented as payment for a transaction or a different merchant. For example, a merchant may cause an offer for a product to be printed on a check of the account holder such that the account holder may accept the offer by altering an indicium or signing an appropriate signature line on the check, and submit the acceptance of the offer when presenting the check as payment for a transaction.

Accordingly, in one or more embodiments, an offer indicated on a check may be determined. It may be determined that the offer has been accepted by a payor of the check, the acceptance also being indicated on the check. The check may then be processed in accordance with the offer.

In one or more embodiments, a first instruction for disbursing funds from a checking account associated with the check may be determined based on information indicated on a check, the first instruction indicating a first payee and a first amount to be disbursed. A second instruction for disbursing funds from the checking account may also be determined based on the information indicated on the check the second instruction indicating a second payee and a second amount to be disbursed. The check may then be processed accordance with the first instruction and the second instruction.

An offer that may be printed on a check, or an indication of which may be included on a check, may comprise a benefit to be provided to the account holder in exchange for a commitment by the account holder. A benefit may comprise, for example, a product or discount to be provided to the account holder or an entity indicated by the account holder. For example, the offer may comprise an offer to sell a product, coupon or voucher to the account holder.

It should be noted that a product, as used herein, shall be synonymous with "good," "item", "merchandise," and "service" and may refer to anything licensed, leased, sold, available for sale, available for lease, available for licensing, and/or offered or presented for sale, lease, or licensing including individual products, packages of products, subscriptions to products, contracts, information, services, and intangibles.

It should further be noted that the term "merchant" may refer to an entity who may offer to sell, lease, and/or license one or more products to a consumer (for the consumer or on behalf of another) or to other merchants. For example, merchants may include sales channels, individuals, companies, financial institutions, manufacturers, distributors, direct sellers, re-sellers, and/or retailers. Merchants may transact out of buildings including stores, outlets, malls, casinos, and warehouses, and/or they may transact via any number of additional methods including mail order catalogs, vending machines, online web sites, and/or via telephone marketing. Note that a producer or manufacturer may choose not to sell to customers directly and in such a case, a retailer may serve as the manufacturer's or producer's sales channel.

In one or more embodiments, a benefit may comprise a payment to be made on behalf of an account holder or a waiver of a payment that would otherwise be charged to the account holder. For example, an offer may comprise an offer to pay a price for transactional overdraft protection for a transaction (e.g., if the merchant tendering the offer is not the bank of the account associated with the check) or an offer to waive a price for transactional overdraft protection for a transaction (e.g., if the merchant tendering the offer is the bank of the account associated with the check). In this example, alteration of an indicium by the account holder may constitute both a request for transactional overdraft protection for the transaction for which the check is being presented as payment and an acceptance of the offer to pay the price of waive the price, in exchange for a commitment associated with the offer. In another example, an offer may comprise an offer to waive a fee, or pay a fee on behalf of the account holder, associated with the account of the check. In yet another example, an offer may comprise an offer to pay at least part of the purchase total of the transaction for which the check is being provided as payment for. Thus, the benefit of an offer may be dynamic and determined based on information associated with the transaction for which the check is being presented as payment or based on other information.

As described, an offer may also define a commitment by the account holder. Examples of commitments that may be defined by an offer include, a monetary amount to be paid by the account holder (e.g., the monetary amount to be deducted from the account associated with the check), an activity to be performed by the account holder, a waiver of a right by the account holder and/or an agreement to switch service providers (e.g., telephone service providers).

Several examples of offers that may be printed on a check, or an indication of which may be included on a check, follow:

Example Offer 1: Indicate here if you would like to receive notification when an attempt to cash this check is made, for a $0.25 fee.

Example Offer 2: Indicate here if you would like to order a new book of checks, for a fee based on the fee schedule included with your last book of checks.

Example Offer 3: Indicate here if you would like XYZ Car Co. to pay 50% of your purchase total for this transaction (up to a $100 value) in exchange for your agreement to test drive Model 1 of an XYZ car within the next two weeks.

Example Offer 4: Indicate here if you would like to XYZ Cellular Telephone Co. to add $50.00 to your checking account in exchange for you signing a two year cellular service contract with us within the next thirty days (contract to be mailed to you upon acceptance of this offer).

Example Offer 5: Indicate here if you would like to accept Offer #012-34-5678.

Example Offer 6: Indicate here if you would like to accept the offer presented by the POS for this transaction.

Example Offer 7: Indicate here if you would like to accept an offer and please write in the offer identifier of the offer you are accepting.

Example Offer 8: Indicate here if you would like to register a back-up financial account for this transaction and please write in the account number of the financial account.

Example Offer 9: Indicate here if you would like to make payment to this merchant an automatic monthly disbursement from your checking account on the date of the month specified and in the amount of this check.

It should be noted that the language "indicate here if" is meant to be exemplary only. Other language may be used to inform an account holder of how to accept an offer.

As indicated in the example offer 1, in one or more embodiments an offer may comprise an offer to provide information related to the processing of the check to the payor, the information comprising information in addition to general information provided by a bank associated with the check to all payors of processed checks. For example, by accepting an offer the payor may indicate a request to be provided with information regarding when a check is cashed (e.g., a payor may be e-mailed when the check is presented for payment to the payor's bank and/or to a payee's bank). In another example, a payor may indicate a request to be provided with information regarding when a check is not going to be honored (e.g., the payor has insufficient finds in the checking account and, unless action is taken by the payor to increase the funds, the check will not be honored by the payor's bank). It should be noted that, in one or more embodiments, a bank may charge a fee to the payor in exchange for providing such information. The fee may be deducted directly from the account against which the check via which the offer was accepted was drawn.

As indicated by example offer 3, in one or more embodiments, an offer may comprise an offer to provide a benefit to a payor in exchange for the payor's commitment to an activity or other obligation. In such an embodiment, the benefit may not be provided to the payor until a confirmation that the payor fulfilled the obligation has been received. In other embodiments, the benefit may be provided to the payor upon acceptance of the offer.

For example, in the example offer 3, if a payor indicates an acceptance of such an offer when presenting a check to a merchant for $80.00, processing of the check may comprise disbursing only $40.00 from the account against which the check is drawn to the payee indicated on the check. The remaining $40.00 may then be paid by the merchant of the offer (XYZ Car Co. in the example offer 3). For example, the payor's acceptance of the offer may be communicated to XYZ Car Co., which may in response authorize disbursement of the remaining $40.00 to the payee of the check. In another embodiment XYZ Car Co. need not provide authorization for the particular transaction, as XYZ Car Co. may register an authorization with a bank processing the check that an amount up to $100.00 may be disbursed from an account specified by XYZ Car Co. any time the offer by XYZ Car Co. is accepted. It should be noted that, in embodiments where a benefit is provided to a payor before confirmation of the payor's fulfillment of the obligation is received, the benefit may be effectively withdrawn from the payor if such confirmation is not received within a predetermined period of time (e.g., two weeks from a time of an acceptance of the offer in the example offer 3).

As indicated by example offer 6, in one or more embodiments, an offer may comprise an offer from the merchant to whom the payor is presenting the check as payment for a transaction. Such a merchant may be referred to as a primary payee of the check. For example, when the payor presents a check as payment at a point of sale terminal of a retailer, the point of sale may output an offer for an additional product (e.g., a warranty for the product the payor is purchasing). The payor may indicate an acceptance of the offer, even if the offer is presented after the payor fills out the amount of the check, by altering a designated indicium on the check. For example, the payor may write in an identifier of an offer the payor desires to accept in a designated area of the check. The offer identifier may be stored in a memory accessible by the payor's bank, in association with a price of the product that is the subject of the offer and a payee of the offer (also referred to as a secondary payee herein). In the present example the payee of the offer is the merchant to whom the payor is presenting the check as payment for a transaction. In other words, the primary payee is also the secondary payee. Thus, by accepting the offer the payor is instructing the bank to disburse the price associated with the offer to the merchant (the secondary payee) in addition to the amount the check is written out for.

In other embodiments, as described herein, an offer may comprise an offer from a merchant other than the merchant to which the check via which an offer is accepted is presented as payment for a transaction.

As indicated in some of the example offers above (e.g., example offers 5, 6, and 7), the terms of the offer being accepted by the account holder via the check need not be included on the check. It is sufficient that information enabling an entity processing the check to identify the offer be included on the check. For example, in one or more embodiments, one or more offer identifiers may be stored in a memory accessible by the entity processing the check. For example, an Offer Database may store a record for each offer, the record also indicating the terms of the offer (e.g., the benefit and commitment defined by the offer). Accordingly, if an offer identifier is included on a check (e.g., printed on the check or handwritten on the check), the entity processing the check may access the database and determine, based on the offer identifier, the terms of the offer.

In one or more embodiments, an offer identifier may be stored in association with an identifier identifying the account holder (e.g., the checking account number of the account holder). Accordingly, the offer identifier need not be included on the check. The account holder may simply provide an acceptance of the offer associated with the identifier identifying the account holder. So long as the identifier identifying the account holder is included on the check, the offer identifier and/or the terms of the offer may be determined based on the identifier identifying the account holder.

As indicated by example offer 8, in one embodiment an account holder may indicate on a check a back-up account to be used to pay the payee of the check if the balance of the checking account against which the check is drawn is insufficient to pay the amount of the check. For example, an account holder is particularly concerned that a payee of a check (e.g., a bank holding a mortgage of the account holder) obtains the full payment intended by the check, the account holder may indicate on the check a credit card account, savings account, or other financial account from which funds are to be drawn in order to provide the full amount indicated on the check to the payee of the check. Thus, for example, assuming an account holder indicated a credit card account number on a check, if the check is written for $1,000.00 and the checking account has a balance of $850.00 at the time the payee attempts to cash the check, the $850.00 may be provided to the payee (or an amount that does not result in the checking account balance being below a minimum balance). The account holder's bank may then cause the full $1,000.00 to be provided to the payee. In one embodiment, such usage of a back-up account when processing a check may not be communicated to the payee.

As indicated by example offer 9, in one embodiment an offer may comprise an offer to initiate a recurring bill payment on behalf of the account holder. For example, when paying a mortgage bill an account holder may accept an offer to automatically have the mortgage bill paid every month on the day of the month specified by the account holder. Thus, for example, an acceptance of such an offer may cause the bank of the checking account against which the check on which the acceptance is specified to automatically pay the payee of the check the amount of the check on a monthly (or other period) basis. In such embodiments, the account holder may receive an e-mail confirmation each time the periodic disbursement to the payee is performed. Thus, for example, the account holder may register an e-mail address when accepting the offer or at another time.

In one embodiment, an account holder may register with the bank at which the checking account of the account holder is maintained a personal identification number (PIN) for accepting offers. The account holder may write this PIN on the check as verification that an acceptance of an offer is being provided by the account holder.

For example, an account holder may receive (e.g., along with a monthly checking account statement) one or more offers that the account holder may accept when presenting a check against the checking account. For example, the account holder may write, in a designated area of the check, an identifier identifying the offer the account holder desires to accept along with the account holder's PIN. In instances where the account holder is only provided with one offer per period of time (e.g., one offer a month), the account holder may not be required to provide an offer identifier but may simply write the PIN on the check, it being assumed that the account holder is accepting the offer available to the account holder at the time the check is presented for payment to a merchant.

As described above, a check may have included thereon an offer or an indication of an offer. An offer being included on a check may comprise text describing the benefit and commitment defined by the offer being printed on the check (e.g., in a designated area of the front of the check or on the back of the check). An indication of an offer may comprise a code or other representation of an offer being printed or handwritten on the check (e.g., in a designated area of the check, such as the memo line or another area).

The offer or an indication of the offer may be included on a check at various times. For example, in one embodiment, an offer or indication of an offer may be printed on a check at a time the check is printed in a book of checks for the account holder. For example, each check in a book of checks (or a subset of checks in a book of checks) may have printed thereon one or more offers. It should be noted that each such check may include a unique offer or set of offers or the same offer or set of offers may be printed on more than one check.

In another embodiment, an offer or indication of an offer may be included on a check substantially at a time the check is presented as payment for a transaction. For example, the account holder may be presenting the check to a merchant as payment for a transaction conducted with the merchant. The point of sale device of the merchant may at this time output an offer or an indication of an offer to the account holder. For example, the offer or indication of an offer may be printed on the check by a device of the point of sale (POS) operated by the merchant. For example, a printer of the POS may print an offer or indication of an offer on the check. In another example, an output device of the POS may cause an offer or indication of an offer to be output (e.g., displayed to the account holder or displayed to an operator of the POS, who may then convey the offer to the account holder). The account holder or operator of the POS may then handwrite in the offer or indication of the offer onto the check. For example, as will be described in more detail below, an output device associated with a POS of a merchant may display a code. The account holder may indicate acceptance of the offer by handwriting the code in a designated area of the check.

FIGS. 10A through 10D illustrate various embodiments of a check via which an account holder may accept an offer. The embodiments illustrated in FIGS. 10A through 10D are similar to embodiment of the check illustrated in FIG. 2 and all common elements have the same number assigned thereto. Accordingly, a description of elements 202 through 214 may be found above with respect to FIG. 2. Each of the checks illustrated in FIGS. 10 through 10D include an embodiment of an area 218 usable by an account holder to indicate acceptance of an offer. The different embodiment of area 218 illustrated in FIGS. 10A through 10D are examples only of some methods an account holder may use to indicate acceptance of an offer and are not meant to be limiting in any manner.

Figure 10A:
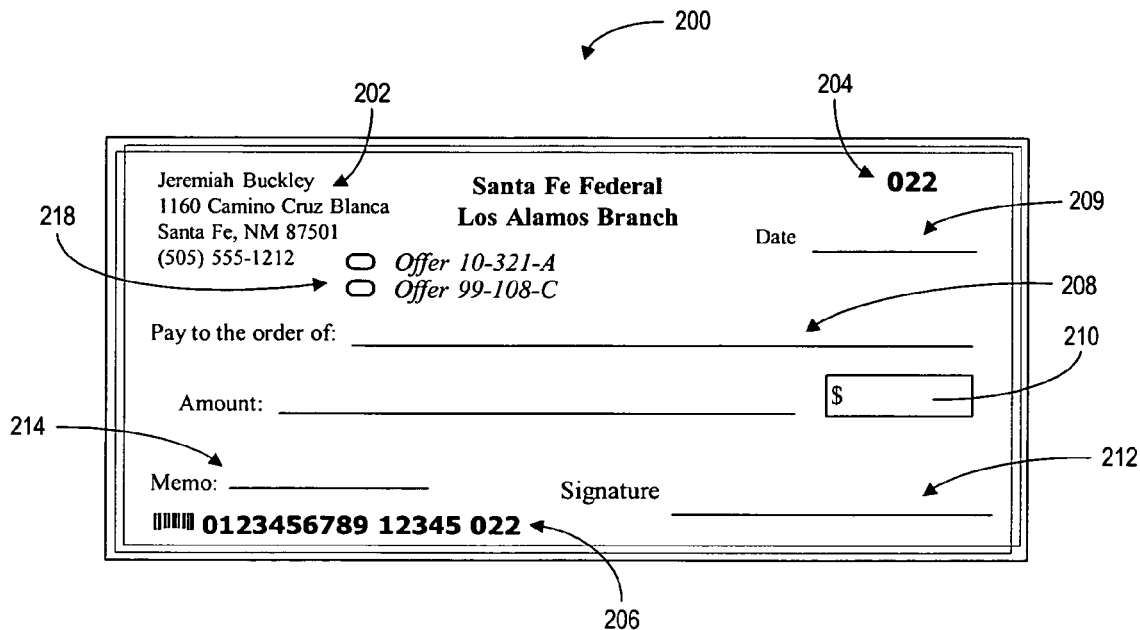
FIGS. 10A-10D each illustrate an example embodiment of a check, in accordance with one or more embodiments of the present invention.

In the embodiment of FIG. 10A, an area 218 has printed therein two offer identifiers, each offer identifier identifying an offer that may be accepted by the account holder. Corresponding to each offer identifier in area 218 is an alterable indicium in the form of an oval that may be filled in (e.g., using a number two pencil, for readability by a machine) by the account holder. Thus, the account holder may accept offer "10-321-A" by filling in (or, e.g., checking or otherwise marking) the oval next to the offer identifier "10-321-A". In other embodiments, in addition to or in lieu of an oval that may be filled in by the account holder, area 218 may include a section (e.g. a line) usable by the account holder to provide verification of the acceptance. For example, the account holder may be required to write in a PIN (as described above), initials and/or a signature.

In one embodiment, a merchant at which the account holder is presenting a check on which an offer is accepted may require a photo identification before accepting the check. In such embodiments, the merchant may be required to provide verification that the photo identification was received and/or that the account holder's acceptance was verified. For example, the merchant may be required to provide a merchant identifier or merchant PIN. Otherwise, the entity processing the check may disregard the acceptance of the offer as non-verified and thus non-binding.

As illustrated in the embodiment of FIG. 10A, the terms of an offer need not be included on the check. An account holder may determine the terms of the offers indicated on a check by, for example, checking a catalog, brochure or Web site on which the terms corresponding to each offer identifier are posted. The entity processing the check may determine the terms of the offer being accepted by, for example, accessing a database of offers that stores the terms corresponding to each offer identifier.

In some embodiments, in addition to or in lieu of the offer identifier being printed on the check, the actual terms of the offer may be printed on the check.

Figure 10B:
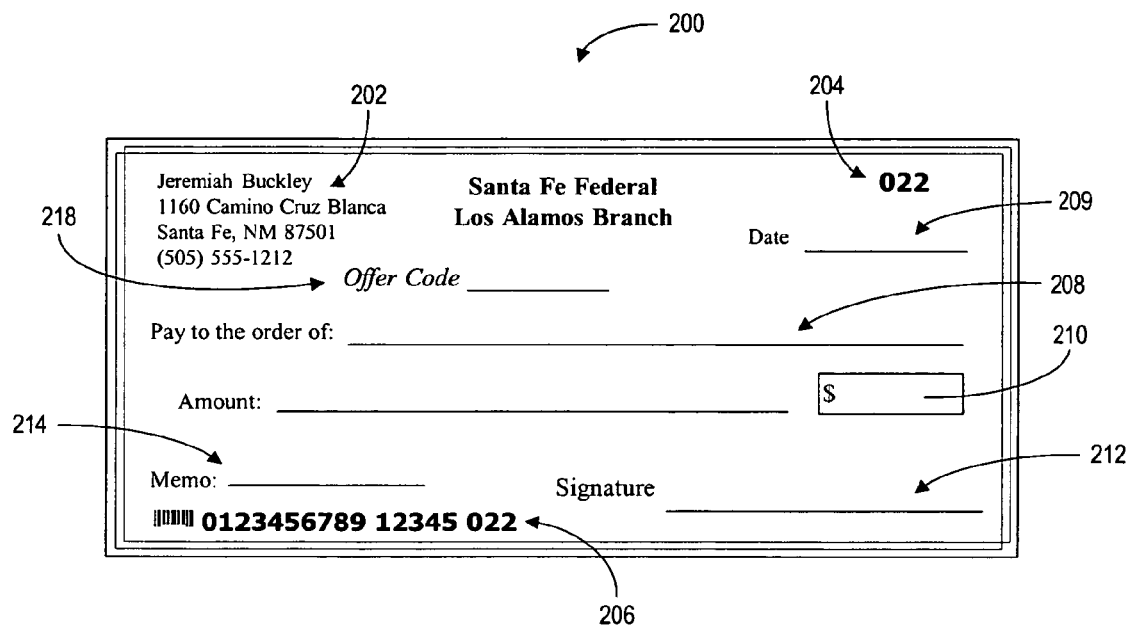

Referring now to FIG. 10B, an embodiment of a check includes an area 218 that an account holder may use to provide acceptance of an offer. Area 218 of the embodiment of FIG. 10B includes a line on which an account holder may write an offer code or other identifier identifying an offer the account holder desires to accept. For example, in one embodiment a POS device of a merchant at which the account holder is presenting the check may output an offer and/or an identifier of an offer. The account holder may handwrite this identifier of the offer into area 218. In other embodiments, a POS printer may be configured to print an offer identifier on the line in area 218. In some embodiments, the account holder may be required to provide additional verification along with the offer identifier. For example, area 218 may include an area in which the account holder may provide a signature, initials, PIN or other verification of the account holder's identity. In another embodiment, as described above with reference to FIG. 10A, a merchant at which the check is presented may be required to require photo identification from the account holder and/or provide a merchant verification on the check that the account holder's identity was verified for purposes of verifying the offer acceptance.

Figure 10C:
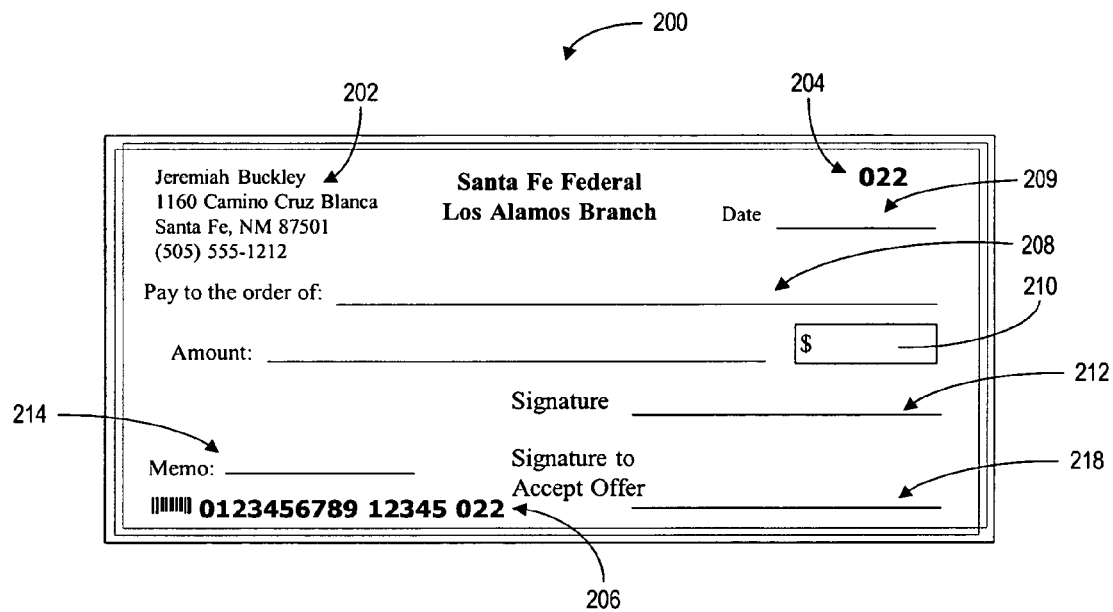

Referring now to FIG. 10C, an embodiment of a check includes an area 218 for use by an account holder to indicate acceptance of an offer. In the embodiment of FIG. 10C the area 218 includes a line for a signature of the account holder. The signature line in area 218 is in addition to the conventional signature line of a check, for use by an account holder to authorize disbursement of funds from a checking account. Accordingly, an account holder may indicate acceptance of an offer by signing on the line in area 218. In one embodiment, the account holder may authorize disbursement of funds to the payee indicated on line 208 in the amount indicated in area 210 by signing the signature line 212. The account holder may then separately indicate acceptance of an offer by signing on the signature line in area 218. In other embodiments, an account holder may indicate both an acceptance of an offer and an authorization for disbursement of funds to the payee indicated on line 208 by signing on the signature line in area 218. In such an embodiment, if the account holder does not desire to accept an offer but merely desires to authorize the disbursement of funds to the payee indicated on line 208, the account holder may simply sign on the signature line 212.

In one or more embodiments, in addition to signing on the signature line in area 218, the account holder may be required to write in a code or other identifier identifying the offer that the account holder is accepting. In other embodiments, there may not be a need for the account holder to write in the identifier as the offer that the account holder is accepting may be otherwise determined. For example, an identifier of an offer may be printed elsewhere on the check. The identifier of the offer may be printed, for example, at the time the check is printed or by a POS printer at the time the check is presented as payment to a merchant. In another example, an offer may be associated with the account number or other account holder identifier (as described above with reference to FIG. 10A) in a database accessible by the entity processing the check. Accordingly, the offer the account holder is accepting may be determined by accessing the database.

Figure 10D:
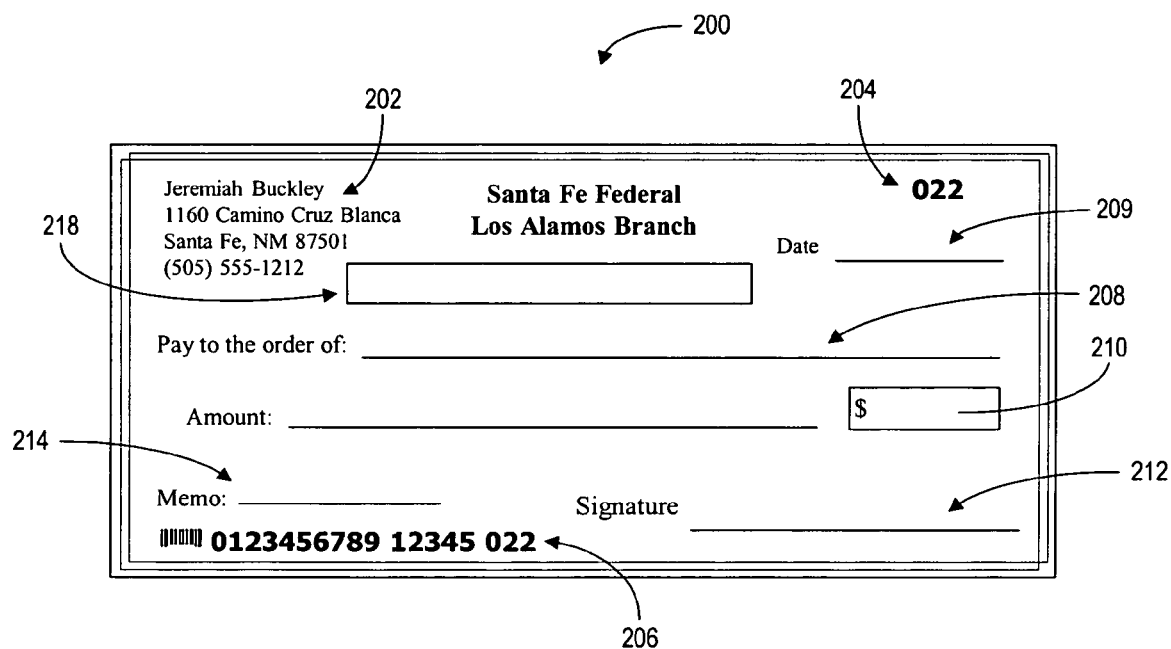

Referring now to FIG. 10D, an area 218 comprises a blank space on the check designated for printing or hand writing of an indication of an offer. For example, in one or more embodiments a printer of a POS may be configured to print an offer or indication of an offer in the area 218. In another example, the account holder may receive instructions to hand write an offer identifier (and, e.g., provide a signature) in the area 218.

In one embodiment, adhesive labels may be provided to an account holder, each adhesive label including an offer that may be accepted by the account holder. In this embodiment the account holder may indicate acceptance of the offer by affixing the adhesive label having the offer printed thereon to area 218 of the embodiment of FIG. 10D.

It should be noted that although the area 218 is illustrated in each of FIGS. 10 through 10D as being located on the front of a check, in other embodiments the area 218 may be located on the back of a check.

It should further be noted that, in accordance with one or more embodiments, by indicating an acceptance of an offer the account holder provides an instruction for the disbursement of funds from the account against which the check is drawn. For example, in embodiments where by accepting the offer the account holder is agreeing to purchase a product, the acceptance of the offer may comprise an instruction to disburse the price of the product as defined by the offer to a payee defined by the offer.

In one or more embodiments, by indicating an acceptance of an offer the account holder provides an authorization for the addition of funds to the account against which the check is drawn. For example, in embodiments where by accepting an offer the account holder is agreeing to receive a benefit that comprises a monetary amount, the acceptance of the offer may comprise an authorization for a benefit provider defined by the offer to transfer a monetary amount defined by the offer to the account against which the check is drawn.

In one or more embodiments an acceptance of an offer may be conditioned on the account holder having sufficient finds in the checking account to pay a fee associated with the offer. For example, in one embodiment a rule associated with the processing of a check via which an offer has been accepted may be that the acceptance is only valid if the balance of the account is sufficient to fund the accepted offer, without the account holder needing to specify that the rule is to apply. In this manner, an acceptance of an offer may never result in an overdrawing of the account. In another embodiment, an account holder may be required to specify such a condition in order for the acceptance to be contingent on the condition.

Figure 11A:
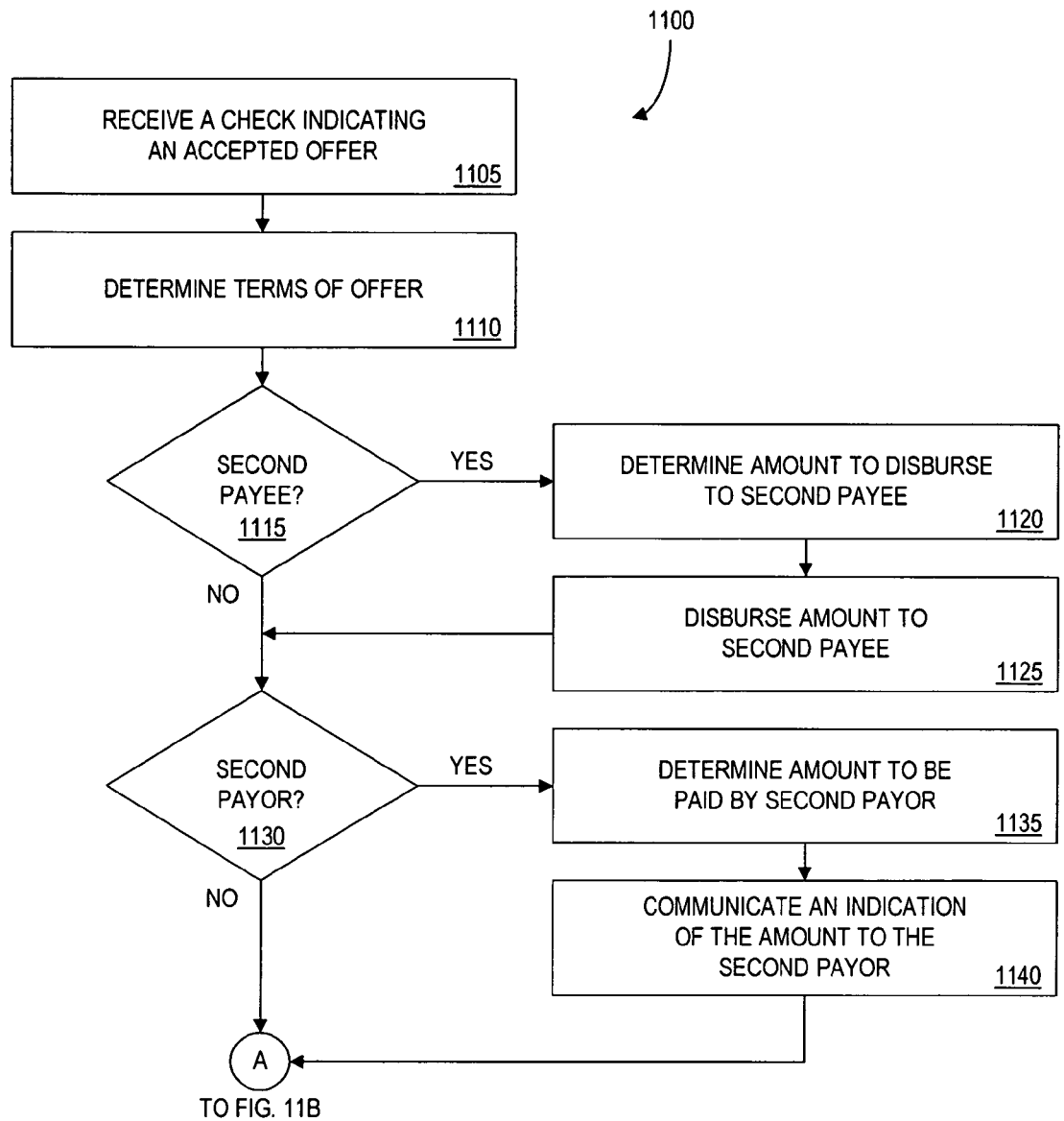
FIGS. 11A and 11B are a flowchart illustrating an example process in accordance with one or more embodiments of the present invention.
Figure 11B:
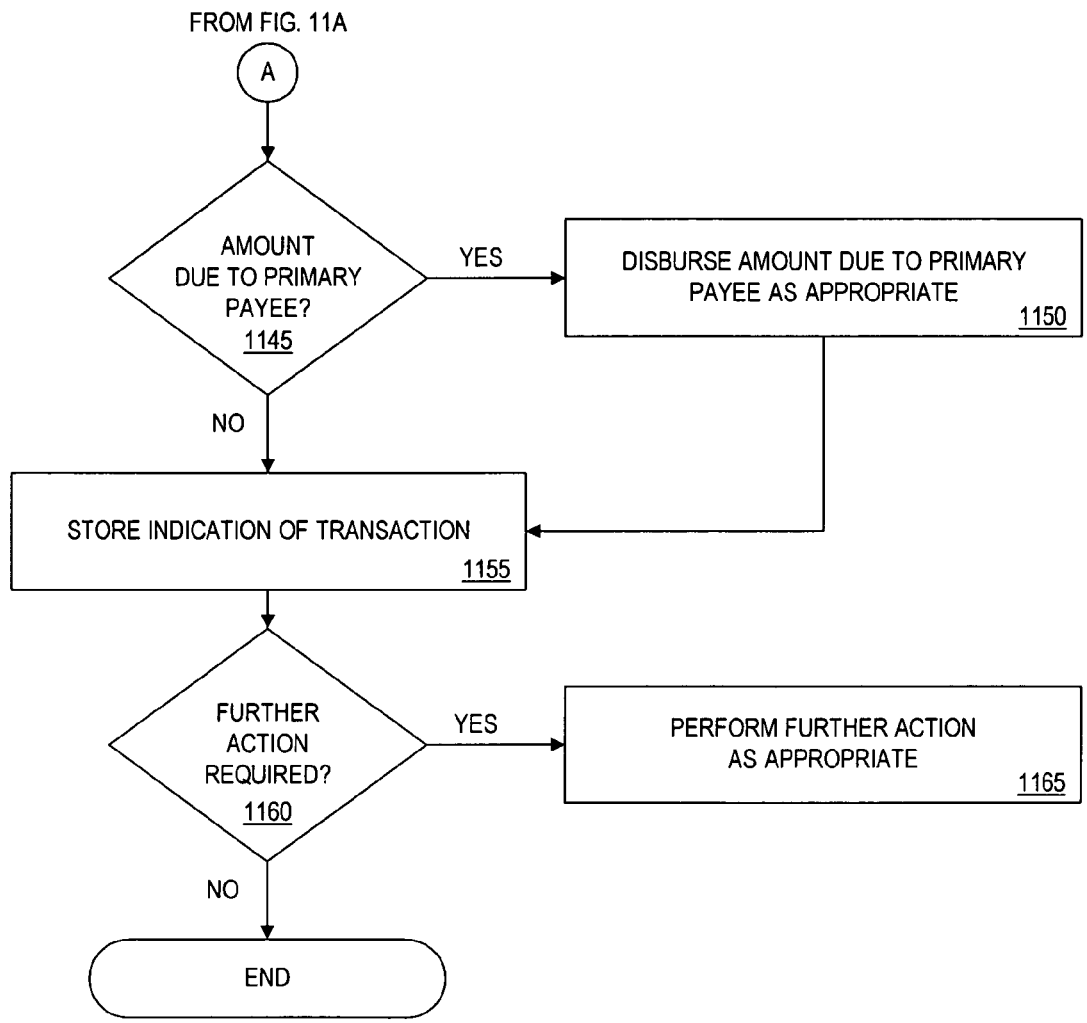

Processing a check in accordance with embodiments of the present invention may comprise steps in addition to those for conventional processing of a check. FIGS. 11A and 11B are a flow diagram illustrating an example process 1100 that may be utilized in one or more embodiments of the present invention. It should be understood that a process in accordance with embodiments of the present invention may include different, additional or fewer steps than are described with reference to process 1100. Further, the steps of process 1100 may be performed in an order different from that specified in process 1100. Process 1100 may be performed, for example, by a Federal Reserve bank 140, the original payee's bank 120 (i.e., the bank of the payee to whom the check was presented as payment for a transaction), originating bank 150, a bank of a merchant associated with the offer accepted via the check, and/or another entity practicing aspects of the present invention.

Process 1100 begins with step 1105, in which a check indicating an offer accepted by an account holder is received. This may comprise, for example, the originating bank 150 or the Reserve Bank 140 receiving the check or an indication of the information on the check. In one embodiment, step 1105 may further comprise verifying that the offer was accepted by the account holder (e.g., a PIN, signature or other identifier of the account holder may be included on the check and verified by comparison to an identifier stored in association with the account holder).

In step 1110 the terms of the offer accepted via the check are determined. In some embodiments this may comprise reading the terms of the offer directly from the check (e.g., the terms may be indicated on the check in machine-readable format, such as a bar code and/or magnetic ink, or may be ready by bank personnel). In other embodiments determining the terms of the offer may comprise accessing a database of offers based on an offer identifier indicated on the check and/or querying another entity for the terms of the offer based on the offer identifier. In the former, the bank or other entity processing the check may store in memory a database of offers that may be accepted on a check, with one or more terms of the offer being stored in association with each offer, each offer being identified by an offer identifier. In the latter, the bank or other entity processing the check may not store information on offers that may be accepted but may rather contact another entity that does store such information. For example, the company that printed the check in question, or another entity practicing embodiments of the present invention, may store such information and may be contacted, e.g., via a telephone or other communication network, for the information.

Once the terms of the offer are determined, it is determined in step 1115 whether a second payee is associated with the check. As described a first or primary payee of the check is the payee identified on line 208 (FIG. 2 and FIGS. 10A-10D) of the check, the merchant to whom the check is presented as payment for a transaction. As also described, an offer may comprise an offer to sell a product to the account holder, for a price defined by the offer. If the account holder were to accept such an offer, the merchant defined by the offer is the second or secondary payee of the check since, by accepting the offer, the account holder authorizes disbursement of the price defined by the offer to the merchant defined by the offer. Accordingly, step 1115 may comprise whether the terms of the offer define a second payee for the check (e.g., is this offer an offer to sell a product to the account holder?).

It should be noted that, in one or more embodiments, the financial institution processing the check may comprise the second payee. For example, if the offer accepted via the check is an offer to sell transactional overdraft protection to the account holder, the financial institution of the account against which the check is drawn may both process the check and be the second payee.

If it is determined, in step 1115, that a second payee is associated with the check based on the terms of the offer, process 1100 continues to step 1120. In step 1120 the amount to be disbursed to the second payee is determined. This determination may comprise, for example, the price defined by the offer. For example, the terms of the offer may specify a price (e.g., $20.00). In another example, the terms of the offer may define a method for determining a price (e.g., example offer 2 specifies that a fee schedule is to be consulted for determining the price of the offer).

Once the amount to be disbursed to the second payee is determined, the determined amount is disbursed in step 1125. In one or more embodiments, there may be an additional step of determining whether the account balance is sufficient for the amount to be disbursed to the second payee and the disbursement may only be performed if the balance is sufficient.

If it is determined in step 1115 that there is a second payee is not defined by the terms of the offer, or after step 1125 is performed, the process 1100 continues to step 1130. In process 1130 it is determined whether a second payor is defined by the offer accepted via the check. As described, in one or more embodiments an offer may comprise an offer to provide a benefit to the account holder (who is the primary payor of the check in some embodiments). For example, an offer may comprise an offer to pay a monetary amount to the account holder or to pay at least a portion of the amount of the check on behalf of the primary payor. Example offers 3 and 4 illustrate offers that define a second payor.

If it is determined in step 1130 that the terms of the offer define a second payor, the process 1100 continues to step 1135. In step 1135 the amount to be paid by the second payor is determined. For example, if the terms of the offer define that the second payor is to provide a monetary benefit to the account holder by adding a monetary amount to the account of the account holder, step 1135 may comprise determining the monetary amount to be added. In another example, if the terms of the offer define that the second payor is to pay a monetary amount on behalf of the account holder, step 1135 may comprise determining the monetary amount to be paid by the second payor, based on the terms of the offer. It should be noted that step 1135 may further comprise determining the entity to whom the second payor owes the amount to be paid. For example, the second payor may owe the monetary amount to the account holder (e.g., as in example offer 4 above) and/or to the merchant to whom the check was provided as payment for a transaction (e.g., as in example offer 3 above).

Once the amount to be paid by the second payor is determined, process 1100 continues to step 1140, where an indication of the amount to be paid by the second payor is communicated to the second payor. For example, an electronic communication (e.g., via electronic mail or via contacting a computing device of the second payor over a communication network) may be transmitted to the second payor. In one embodiment, the second payor may authorize the disbursement of the amount to be paid in response to this communication and the transfer of funds may be performed from the payor to the entity to whom the payor owes the amount. Step 1140 may further comprise communicating to the payor an indication that the account holder accepted the offer, including the identifier of the offer, contact information for the payor, and/or a time of the acceptance (e.g., the date of the check, as indicated on line 209 of the check of FIGS. 10A-10D).

If it is determined, in step 1130, that a second payor is not defined by the terms of the accepted offer, or after step 1145 is performed, process 1100 continues to step 1145. In step 1145 it is determined whether an amount is due to the primary payee of the check (e.g., the entity indicated on line 208 of the checks embodied in FIGS. 10A-10D) from the account holder. For example, if the accepted offer defined by the check comprises an offer by a second payor (the merchant defined by the offer) to pay at least a portion of the amount indicated in line 210 (FIGS. 10A-10D) of the check, the amount due to the primary payee from the account holder may be less than the amount that the check is written out for. Thus, step 1130 may comprise determining whether the accepted offer affects the amount indicated in line 210 and, if so, how the offer affects the amount.

In one example, as described above, an accepted offer may reduce the amount due to the primary payee from the account holder. In another example, an accepted offer may increase the amount due to the primary payee from the account holder. For example, if the accepted offer comprises an offer from the primary payee (the merchant to whom the check was presented as payment for a transaction) to sell an additional product to the payor, the price of the product may be added to the amount in line 210 of the check.

Once the amount due to the primary payee from the account holder is determined, this amount is disbursed to the primary payee in step 1150. In one embodiment, step 1150 may be preceded by a determination of whether the balance of the account against which the check is drawn to pay the amount due to the primary payee.

The process 1100 then continues to step 1155, in which an indication of the transaction (the processing of the check) is stored. For example, the amounts disbursed to/from all entities may be stored in association with the check number and the offer identifier. It should be noted that if it is determined, in step 1145, that an amount is not due to the primary payee, process 1100 continues from step 1145 to step 1155.

In step 1160 it is determined whether any further action is required based on the terms of the offer. For example, as described, in one or more embodiments an offer may comprise an offer to provide certain information to the account holder (e.g., when the check is cashed by the primary payee, when the check is in danger of not being honored due to an insufficient balance of the account against which the check is drawn). In such embodiments, further action may be necessary after the check is processed. For example, the account holder may need to be contacted and provided with the information requested.

If further action is necessary for the processing of the accepted offer, the process 1100 continues to step 1165, where the further action is performed. For example, contact information for the account holder may be retrieved from a database (e.g., the account holder's e-mail address or pager number may be retrieved) and the information defined by the terms of the offer may be transmitted to the account holder. The performance of the action in step 1165 may be stored in association with the indication of the transaction, as performed in step 1155. If no further action is necessary, the process 1100 ends.

As is apparent from the above-described embodiments, Applicants have recognized that, in some situations, a check may be an effective marketing tool. For example, it is contemplated that merchants may find it advantageous to pay an entity to print offers on checks to be provided to account holders. In one or more embodiments such offers may be targeted to certain account holders based on, for example, information associated with the account holders (e.g., demographic information, geographic location, purchasing habits, etc.). For example, a company that prints check and/or banks or other financial companies at which account holders open accounts against which checks may be drawn may collect data on account holders that may be useful to merchants in targeting offers.

It is contemplated that merchants may be willing to pay a fee in exchange for the ability to have offers, indications of offers, or indicium for accepting offers printed on checks. Such fees may be paid to, for example, the companies that prints the checks, a bank or another financial company maintaining the accounts against which the checks are drawn, the account holders, and/or another entity practicing aspects of the present invention. For example, an account holder may receive books of checks for free if the account holder agrees to have offers, indications of offers, or indicium for accepting offers printed on the checks. The fees paid by the merchants may, for example, be used to pay for the books of checks. In one embodiment, an account holder may be compensated (e.g., from the fees paid by the merchants) to allow offers, indications of offers and/or indicium for accepting offers printed on at least one check provided to the account holder.

In embodiments wherein the merchant at which the account holder provides the check as payment is the merchant that outputs an offer or indication of an offer that is accepted via the check, the merchant may pay a fee for outputting the offer or indication of the offer once the offer is accepted. For example, in such an embodiment processing the check may comprise determining the payee (who is the merchant of the accepted offer) and billing a fee to the payee for processing the offer. Such a fee may be payable to, for example, the account holder's bank and/or the company that printed the check.

In one embodiment, an account holder may be provided with a book of checks, wherein the payor of each of the checks (or a subset of the checks) is at least one merchant. The account holder may simply fill in the payee and amount to be paid when using the check. By using such a check, however, the account holder may be providing an acceptance of an obligation specified by the check. Such a check may have an account number of the merchant payor indicated thereon, such that the merchant payor's account is used to disburse funds to the payee specified by the account holder. In this manner, the account holder may pay with a check yet avoid having his own account used to disburse payment to the payee.

In the above embodiment, processing such a check of a merchant payor may comprise storing an indication of the account holder's acceptance of the obligation, for subsequent determination of whether the account holder successfully fulfilled the obligation. In one embodiment, if the account holder fails to fulfill the obligation within a predetermined period of time, a penalty may be assessed against the account holder. For example, the account holder may be charged for the amount of the check via which the account holder incurred the obligation plus an additional amount. The additional amount may comprise, for example, a predetermined percentage of the amount of the check or accrued interest on the amount of the check. For example, the check may have indicated thereon the account holder's account identifier (e.g., an identifier of a checking account associated with the account holder or a credit card identifier) for use in assessing the penalty. Thus, for example, processing the check may further comprise storing an indication of the account for use in assessing a penalty to the account holder if the obligation specified on the check is not fulfilled successfully.

In one or more embodiments, a merchant may act as an effective co-signer of a check, thus guaranteeing to the merchant to whom the check is presented as payment that the co-signer merchant will pay at least a portion of the amount of the check if the account holder has insufficient funds in the account against which the check is drawn. For example, as described above (e.g., example offer 3 and example offer 4), a merchant may offer to provide a benefit to the account holder in exchange for the account holder's commitment to an obligation. In one embodiments such a benefit may comprise guaranteeing payment of the check. For example, Amazon.com™ may offer to guarantee a check for an account holder in exchange for the account holder's commitment to make a minimum purchase from Amazon.com within a predetermined period of time from the acceptance of the offer. In one embodiment, to accept such an offer the account holder may obtain a code from the merchant extending the offer, and a telephone number. The account holder may then write the telephone number and the code on the check. The payee of the check may call the telephone number and input the code to verify that the merchant who extended the offer has in fact agreed to guarantee the check and act as an effective co-signer of the check. In order to obtain such a code, in one embodiment, an account holder may provide information about the transaction for which the check will be provided as payment (e.g., the payee, the amount of the check or an approximation thereof) and/or information about the account holder (e.g., the account number of the account against which the check is to be drawn and/or other information relevant to determining the account holder's credit worthiness).

It is to be understood that the foregoing description is provided for illustrative purposes only and does not limit the scope of the invention. One of ordinary skill in the art, upon reading the present disclosure, may recognize modifications that may be made to the disclosed embodiments, without departing from the spirit and scope of the invention.

What is claimed is:

1. A method for processing a check, comprising:
   Determining, via a check processing device an offer indicated on a check;
   Determining that the offer has been accepted by the payor of the check via the check processing device; and
   Processing the check via the check processing device in accordance with the offer and with a back-up financial account, wherein the back-up financial account is indicated on the check, and wherein the back-up financial account is used to pay at least a portion of an amount indicated on the check when a checking account associated with the check has insufficient funds.

2. The method of claim 1, wherein the offer comprises an offer to provide information related to the processing of the check to the payor, the information comprising information in addition to general information provided by a bank associated with the check to all payors of processed checks.

3. The method of claim 1, wherein the offer comprises an offer for a product in addition to a product being paid for by the check.

4. The method of claim 3, wherein the offer is an offer from a merchant that is a primary payee of the check.

5. The method of claim 4, wherein the offer is printed by a point of sale terminal device operated by the merchant that is the primary payee of the check.

6. The method of claim 3, wherein the offer is an offer from a merchant that is not a primary payee of the check.

7. The method of claim 6, wherein the offer is printed on the check at a time the check is printed for the payor.

8. The method of claim 1, wherein the offer is printed on the check by a printing machine.

9. The method of claim 1, wherein an indication of the offer is printed on the check by a printing machine.

10. The method of claim 1, wherein an indication of the offer is handwritten on the check.

11. The method of claim 1, wherein determining that the offer has been accepted by the payor comprises:
    determining which of a plurality of signature lines printed on the check has been signed by the payor.

12. The method of claim 1, wherein determining that the offer has been accepted by the payor of the check comprises:
    determining that a code has been included in a predetermined area of the check.

13. The method of claim 1, wherein determining the offer comprises determining a code and retrieving, from memory, the offer that corresponds to the code.

14. The method of claim 1, wherein determining the offer comprises determining a code and querying another entity for the offer that corresponds to the code.

15. The method of claim 12, wherein the predetermined area comprises a memo line printed on the check.

16. The method of claim 1, wherein determining the offer and determining that the offer has been accepted by the payor of the check comprises:
    determining that an indicium printed on the check has been altered by the payor.

17. The method of claim 1, wherein determining the offer and determining that the offer has been accepted by the payor of the check comprises:
    determining that a mark has been made in a predetermined area of the check, the predetermined area corresponding to the offer.

18. The method of claim 17, wherein the check has printed thereon a plurality of offers, each offer of the plurality of offers corresponding to a respective area of the check in which a mark can be made by the payor.

19. The method of claim 1, wherein the check has printed thereon a plurality of offers, each offer of the plurality of offers corresponding to a respective indicium alterable by the payor.

20. The method of claim 1, wherein determining an offer comprises determining the offer based on information stored in memory as associated with the payor.

21. The method of claim 1, wherein determining an acceptance comprises determining the acceptance based on information stored in memory as associated with the payor.

22. The method of claim 1, wherein the acceptance comprises a conditional acceptance, such that at least one condition is associated with the acceptance, and further comprising:
    determining whether a condition associated with the acceptance has been satisfied; and
    processing the check in accordance with the acceptance only if the condition has been satisfied.

23. The method of claim 1, wherein processing the check comprises:
    determining additional data indicated on the check and processing the check based on the data.

24. The method of claim 1, wherein processing the check comprises:
    determining, based on the offer, an amount of funds to be disbursed from a financial account associated with the check;
    determining a payee associated with the offer; and providing the amount of funds to the payee.

25. The method of claim 1, wherein processing the check comprises:

determining an action to be performed that is identified by the offer; and causing the action to be performed.

26. The method of claim 1, wherein the offer comprises an offer to provide a monetary amount to the payor in exchange for the payor's commitment to an obligation, such that the payor's acceptance of the offer comprises the payor's agreement to commit to the obligation, and wherein processing the check comprises:

causing the monetary amount to be added to a financial account associated with the payor; and communicating, to a merchant associated with the offer, the payor's commitment to the obligation.

27. A computer readable medium storing instructions configured to direct a processor to;

Determine an offer indicated on a check;

Determine that the offer has been accepted by a payor of the check, the acceptance also being indicated on the check; and Process the check in accordance with the offer and with a back-up financial account, wherein the back-up financial account is indicated on the check, and wherein the back-up financial account is used to pay at least a portion of an amount indicated on the check when a checking account associated with the check has insufficient funds.

\* \* \* \* \*